(12) United States Patent
Raufman

(10) Patent No.: US 9,251,197 B2
(45) Date of Patent: Feb. 2, 2016

(54) SYSTEM, METHOD AND DATA STRUCTURE FOR FAST LOADING, STORING AND ACCESS TO HUGE DATA SETS IN REAL TIME

(75) Inventor: Boaz Raufman, Tel-Aviv (IL)

(73) Assignee: JETHRODATA LTD., Kfar Saba (IL)

( * ) Notice: Subject to any disclaimer, the term of this patent is extended or adjusted under 35 U.S.C. 154(b) by 202 days.

(21) Appl. No.: 14/129,702

(22) PCT Filed: Jun. 27, 2012

(86) PCT No.: PCT/IL2012/050222
§ 371 (c)(1),
(2), (4) Date: Dec. 27, 2013

(87) PCT Pub. No.: WO2013/001535
PCT Pub. Date: Jan. 3, 2013

(65) Prior Publication Data
US 2014/0129530 A1     May 8, 2014

Related U.S. Application Data

(60) Provisional application No. 61/457,877, filed on Jun. 27, 2011.

(51) Int. Cl.
*G06F 17/30* (2006.01)
*G06F 7/78* (2006.01)

(52) U.S. Cl.
CPC ............ *G06F 17/30371* (2013.01); *G06F 7/78* (2013.01); *G06F 17/30946* (2013.01)

(58) Field of Classification Search
USPC ........................ 707/609, 687, 790, 821, 953
See application file for complete search history.

(56) References Cited

U.S. PATENT DOCUMENTS

| | | | | |
|---|---|---|---|---|
| 7,546,602 | B2 * | 6/2009 | Hejlsberg | G06F 9/54 717/114 |
| 2005/0116951 | A1 * | 6/2005 | Stephenson | G06T 15/40 345/424 |
| 2010/0169274 | A1 * | 7/2010 | Kulkarni | G06F 17/30312 707/609 |
| 2013/0169762 | A1 * | 7/2013 | Kanemaru | H04N 13/0452 348/51 |

\* cited by examiner

*Primary Examiner* — Sana Al Hashemi
(74) *Attorney, Agent, or Firm* — Browdy and Neimark, PLLC

(57) ABSTRACT

A computerized system including a processor and a computer-readable non-transient memory in communication with the processor, the memory storing instructions that when executed manage a novel data structure and related group of algorithms that can be used as a method for representing a set and as a base for very efficient indexing, hash and compression. SHB is an improvement of hierarchical bitmap. An improved database system that can utilize the innovative data structure which includes a raw data stream provided to the system via a data processing module, data blocks, fields indexes tables and a keys table. There is provided an index creating process and a columns creating process, for transforming the data blocks and tables into index blocks and data columns.

25 Claims, 10 Drawing Sheets

Counter Vector Level 0: | 0 | 2 | 2 | 3 |
Bit Vector Level 0: | 0110 | 0000 0100 |

Counter Vector Level 1: | 0 | 2 | 5 | 7 |
Bit Vector Level 1: | 0101 | 1101 | 1001 |

Counter Vector Level 2: | 0 | 2 | 5 | 9 | 11 | 14 | 17 | 18 |
Bit Vector Level 2: | 0101 | 1101 | 1111 | 0101 | 1101 | 1110 | 0010 |

FIG. 3A

SYSTEM, METHOD AND DATA STRUCTURE FOR FAST LOADING, STORING AND ACCESS TO HUGE DATA SETS IN REAL TIME

The present application claims priority from, and the benefit of, U.S. Provisional Application No. 61/457,877, "System Method and Data Structure for Fast Loading, Storing and Access to Huge Data Sets in Real Time," filed Jun. 27, 2011. The disclosure of the U.S. Provisional Application is hereby incorporated by reference in its entirety.

TECHNOLOGY FIELD

The present invention deals with optimizing storage and retrieval of data from huge databases.

BACKGROUND

Providing business intelligence over huge data volumes is an overwhelming challenge. Organizations generate and collect terabytes of transactions, log records, event data, traffic information, textual messages, transcribed conversations and more mission critical information every day, but struggle when attempting to analyze, search and gain intelligence based on the data. The task is becoming more and more challenging as the typical data warehouse usage model is changing. With rapid growth in the volumes of aggregated data, increasing number of users, new types of queries and a growing need for real time or near real time analytics, the legacy relational database management systems (RDMBS) based data warehouse solutions are becoming more and more inadequate for the changing needs in the online analytical processing (OLAP) domain.

The scenarios of organizations dealing with billions of events generated or collected daily are becoming more and more common.

The legacy technology underpinning the majority of the data warehouse market carries many deficiencies such as high time and resources consuming load processes, high analytic latency, long queries execution time, limited analytic capabilities, non-linear scalability, growing hardware costs and growing maintenance costs.

Bitmaps variants are typically used to implement inverted indexes ids lists when there is a need to maintain and operate over very large and usually dense ids sets. Hierarchical bitmaps and moreover compressed hierarchical bitmaps are less commonly used, partly due to the complexity of the implementation, and while CHB enables to operate efficiently over spare sets as well as dense sets it is considered wasteful for small sets. Its main advantage is efficient union and intersection operations over large sets. In addition to complexity of implementation hierarchical bitmaps were also considered less optimized for disk reads and writes due to the fact that the entire data structure must be loaded into memory for retrieval and dump into the disk entirely for each update.

This invention brings the SHB structure that revolutionize hierarchical bitmaps from a data structure for lists intersection and union into full index for sets of any size (even huge ones) that enable O(1) search time with extremely low memory requirements compare to legacy index structure such as B-Tree, binary search tree and hash. SHB is a most efficient indexing method that may be used, but not limited to, as a full index for database and generally as quick access index to elements in huge data sets.

SUMMARY

The invention may be embodied as a serial database system designed for quick load, efficient store and quick access for huge data sets. The system includes a data container saved in computer readable memory/files holding data set records, possibly in encoded format ordered by their loading order. Each record in the container may be referred to by a logical record id which is a number representing the sequential position of the record in the container. Each unique value in each record column may be encoded to a unique encoded value called key id. For each unique value or unique key id in each column an Inverted index is created, wherein the inverted index is an ordered list of record ids at which the unique value is found and wherein inverted indexes are represented as a simple vector or as CHB if the size of the index is greater than a given threshold; and wherein inverted indexes are saved in computer readable memory/file. The database system includes one or more pairs of data container file and inverted indexes file; wherein the files of each type may be merged by a background process to larger containers holding larger range of record as long as the above conditions are kept.

The invention may be embodied as a method of loading raw data into a serial database system. The method includes: streaming row data records, composed of one or more columns, to a data loader program, wherein the row data may be in a csv format or any other predefined agreed format; adding the record of values sequentially to a pre-allocated computer readable data memory block, wherein the values may be encoded to key ids and wherein said encoding may be based on SHB hash search and insert algorithms; for each predefined number of records to be called "transaction size", adding the current batch of records to the end of a data container file, wherein a single sequential write IO action is guaranteed each time a new records batch is added to the store; for each predefined number of records to be called "block size" (>=transaction size), creating inverted indexes for these record called block's inverted indexes, wherein the inverted index are created per column. The inverted indexes block is a container for the columns inverted indexes. The inverted indexes may be created as follows:

a. reading the records in the data memory block sequentially;
   for each column/field in the record, for each new unique value or unique key id, adding a new key to column's keys index that may be but not limited to tree format or SHB index, wherein in case SHB index is used a preparation process is claimed; and wherein each key in the keys index is mapped to a list of record ids (i.e. inverted index); and adding the current record id to the list.
   For each unique value of unique key id already in the column's keys index—adding the current record id to the end of the record ids list
   If size of record ids lists is greater than a given threshold the list may be converted to CHB; this can be checked while populating the inverted indexes or after all records in the block were processed
b. saving the block's inverted indexes to a file; and
c. save the columns' keys indexes to an index file that contains the column key indexes with a mapping of their related inverted index position in file.

The invention may also be embodied as a method of optimizing the creation of an inverted index block by pre-built index. (This method requires that in the load process as described above for each record, for each unique value in the record column(s) a unique encoded value (key id) is generated.)

For each record processed in the load process, for each column in a record, the method includes:

inserting the value or the encoded value (key id) to a tree index;

mapping each key id to occurrences counter that increases by one every time a key id is repeated;

if the number of unique key id per column is greater than a predefined threshold, using a key ids list instead of a tree index;

for each predefined number of records to be called block size (>=transaction size), converting the tree indexes and the lists if any to SHB indexes, these indexes are called field indexes;

allocating memory for column inverted index memory block according to total number of occurrences calculated previously, using exact allocation if exact number of occurrences for each key is known—i.e. tree index was used to build field index; otherwise, if a list was used, allocating by estimated average inverted index size.

The method further includes: if exact allocation was used when populating pre-allocated inverted indexes vectors, calculating memory location of the inverted indexes vectors using the fields SHB indexes;

if estimated allocation was used when populating pre-allocated inverted indexes vectors, calculating memory location of inverted indexes vector using the serial number of the key in the SHB index multiplied by estimated average inverted index vector size; and if there is a vector overflow, using temporary tree index for the overflowed vectors.

The invention may be embodied as a method of handling update instructions in a serial database.

The method includes:
fetching the row id(s) of the rows to be updated, by executing a query based on the update instruction filter condition;
receiving row ids set from the query as CHB;
allocating new row ids to the rows containing the updated values as if they were new inserted rows;
when the transaction containing update instructions is committed, locking and fetching the deletion map, wherein the deletion map is a CHB format set or rows ids that were deleted from the database; and wherein locking is used to prevent queries execution during the update of the deletion map;
saving the rows with the updated values in the normal process as part of the data block containing inserted rows;
merging the original rows ids set of the updated rows (in CHB format) with the deletion map set (in CHB format) by executing OR operation over CHB; replacing the previous deletion map with the new deletion map; acknowledging commit of the records batch; and unlock the deletion map.

The method may be embodied as a method of handling delete instructions in a serial database. The method includes:
fetching the row id(s) of the rows to be deleted, by executing a query based on the delete instruction filter condition;
receiving row ids set from the query as CHB;
when the transaction containing delete instruction is committed, locking and fetching the deletion map, wherein the deletion map is a CHB format set of rows ids that were deleted from the database, and wherein locking is used to prevent queries execution during the update of the deletion map;
merging the newly deleted rows ids set (in CHB format) with the deletion map set (in CHB format) by executing OR operation over CHB;
replacing the previous deletion map with the new deletion map; confirming commit of delete operation; and unlocking the deletion map.

The invention may be embodied as a method of querying and fetching data from a serial database where the query condition is that column C is equal to a value V. The method includes: for each inverted index block: (a) finding key V in column C inverted index keys and getting mapped value which is the position on the inverted index record in the inverted index block; (b) fetching the inverted index record from inverted index block; and (c) if inverted index record is not in CHB structure converting in memory to CHB format; merging inverted index CHB sets from all blocks to a single CHB result set; in case deletion map exists, fetching deletion map and executing the Boolean operation NOT between the result CHB and the deletion map CHB; the result CHB is a set containing serial numbers of the records (row ids); encoded records may be fetched from data blocks serial storage or from alternative storage by position, wherein records position is calculated according to row id; records may be decoded to values using key id reversed function or key ids index; and result of some aggregation functions such as counting the number of records fulfilling the condition can be calculated from the result CHB structure.

The invention may be embodied as a method for querying and fetching data from a serial database, where the query condition is a complex expression with two or more operands using AND, OR and NOT operators. (A search for complex expression with two or more operands using AND, OR and NOT operators is done by executing the relevant Boolean operation over two or more inverted indexes in CHB format.) The method includes: fetching inverted indexes of each operand as described above in method for search phases A and B; placing the inverted indexes in a stack; fetching inverted indexes from the stack and executing the condition Boolean operations between the inverted indexes in CHB according to the expression condition; in case deletion map exists, fetching deletion map and executing the Boolean operation NOT between the result CHB and the deletion map CHB; the resulting CHB is read as a list of record ids containing serial number of records (row ids); fetching records from storage by position if required; and result of some aggregation functions such as counting the number of records fulfilling the condition can be calculated from the result CHB structure.

The invention may be embodied as a method querying and fetching data from a serial database where the query condition is that column C is either greater than, greater equal than, smaller than or smaller equal than a value V. The method includes: getting key ids of the value range either by using values to keys reversed function or by fetching from key ids table. Wherein a Key ids tree index where keys are the values may be maintained for optimization of range queries; each key in the range is considered as operand in a complex query where all query operators are OR operators; and continuing as with query over complex expression where all range keys are considered as query operands for OR expression.

The invention may be embodied as a method for sorting queries results in a serial database. (This method enable sorting queries result according to a certain column(s) values order and presenting the rows from the results in sorted order.) The method includes: executing the query based on the query where condition; fetching inverted index of the first value by values order of the first sort by column, wherein the values order can be calculated either from sorted key ids index or by key ids order in case keys ids order is equal to values order (for example: if key id equal to numeric values in numeric column); if value of inverted index is not in CHB format, converting it to CHB format; executing intersection operation (AND) between query result CHB and sort by value fetched CHB, wherein the resulting CHB contains the list of rows id to be first in the sort order, wherein rows are fetched either from data blocks or alternative store method and preset according to requested columns list; and wherein in case number of rows presented is less than the number of requested rows, getting the inverted index of the next value and repeating this step; and if more than one sort by columns exists—repeat this using result of the intersection as query result and fetch first/next inverted index of the next sort by column. This is performed recursively.

The invention may be embodied as a method for performing aggregation queries with serial data base. (Aggregation queries are summaries based on values of one or more columns. Aggregations are calculated by serially scanning the original values of the aggregated columns. In a serial database it is usually most efficient to use the compressed column store to generate in memory vectors of original values that match the query conditions.) The method includes: executing the query based on the query where condition; fetching compressed key ids from compressed column(s) that participate in the aggregation according to row ids from result CHB; decompressing the key ids from column; converting key ids to original values using keys reverse functions or keys index; placing the original values in vectors; and calculating the aggregation over the vectors of the original values.

The invention may be embodied as a data structure having: a sequence of bit vectors arranged in layers called levels; each K bits in each bit vector are called a word; each bit in each vector represents a word (K bits) in the consecutive level bit vector. words that contain only zero bits are called empty word. Empty words are not stored in the bit vectors with the exception of the top level bit vector that may contain empty words; given $M_0$ the number of words allowed in the top level bits vector and L the number of levels the maximum numeric value in the set is $M_0*K^L$; a counter vectors per each bit vector level wherein each counter vector member holds a number that represents the total cumulative number of bits counted in each position of the bit vectors starting from the first position of the bit vector. Given that $B_{lx}$ be the number of bits in a word at position x at the bit vector of level l and $C_{lx}$ be the value at position x at the counter vector of level l then $C_{lx}=C_{lx-1}+B_{lx}$; and optional optimization of counter vector memory sized can be achieved by the following optimization method: multiple counter vector layers are used for each bit vector, where each layer uses the next layer set as a base to calculate the cumulative counter.

The invention may be embodied as a method of creating a SHB index. The method includes: inserting index pairs (set members, mapped values) to a tree or sorted list format, whereby the set becomes an ordered set; converting the ordered set to SHB index using SHB Create; allocating a new vector for mapped values. Size of vector=size of set; and for each pair (member, mapped value) in the ordered set fetched by order:
    pair←get next pair from ordered set by order
    ValuesVector[n]=pair.value
    n=n+1

The invention may be embodied as a method of creating a SHB index. The method includes: inserting index keys (set members) to an uncompressed bits vector format; converting the ordered set to SHB index using SHB Create From BitVector; allocating a new vector for mapped values. Size of vector=size of set; and for each pair (member, mapped value) in the original unordered set:
    SerialNo←GetSerialNumber(SHB, pair.member)
    Values Vector[SerialNo−1]=pair.value The invention may be embodied as a method of Adding new members to a SHB index, comprising: collecting new pairs in unordered vector set format; upon reaching a predefined threshold converting unordered vector to SHB index+values vector; merging new SHB index with existing SHB index (operator OR); and merging existing and new mapped values vectors to vectors ordered by the merged SHB index members order.

The invention may be embodied as a method of searching a SHB index, wherein to find value V for set member M in SHB index:
    SerialNo←GetSerialNumber(SHB, M)
    V←Values Vector[SerialNo−1]

The invention may be embodied as a method of creating hash using SHB index. The method includes (assuming keys collection K of size M.): hashing keys in the set with hash function $f$ to numeric value within the predefined large range. If key hash value already exists rehash until unused hash value is found; collecting the keys and their hashed values in vectors so that the position of key k in keys vector K is equal to the position of its hashed value in the hashed values vector H, i.e. $H[m]=\theta''(K[m])$; converting hashed values vector to SHB; and creating positions vector V as follows: for each member H[m] in H let s be the serial number of H[m] in the SHB set (s=getSerialNo(SHB, H[m])) and determine V[s]=m. This means that if k is in K there exists n that denotes number of hashes based on $\theta$ starting from 1 so that $K[V[getSerialNo(SHB,f''(k))]]=k$, wherein the formed structure is now a SHB index in which hashed value are the index keys and the positions of the hashed keys in the keys vector are the mapped values.

The invention may be embodied as a method of using hash using SHB index. The method includes: to check if a key k is in the hash: hashing k to a hash value; searching hash value using SHB index search; if the hash value is found in the index, then comparing the key to the mapped value, and if the mapped value is not equal to the key, then rehashing and repeating search until match is found or until the hash key is not found in the index; if the hash key is not found in the hash index it may be added to the hash by adding the new key to keys array K, adding it's hash value to the SHB index and inserting its position in K to the appropriate position in V.

The invention may be embodied as a method of SHB data compression. The method includes: converting an array of numeric values to be compressed to SHB set representation, wherein this SHB set may be called the SHB compression map; determining the number of bits representing each value in the compressed array (bitSize←Log 2(size(SHB))); generating the compressed array as follows:
    For each numeric value in the original array
    compressedValue←GetSerialNumber(SHB, Value)−1
    concatenate(compressedBitsVector, compressed Value);
and preparing a reverse index for decompression as follows:
    For each member in SHB set (read in sequential order)
        ReverseIndex[counter++]=member.

The invention may be embodied as a method of SHB data decompression. The method includes: fetching the original value of an element by its position in the original vector by:
    compressed Value←getbits(compressedBitsVector, position*bitSize, bitSize)
    original Value←ReverseIndex[compressedValue]

getbits(bitsVector, pos,len)→return len bits from bits Vector starting from position pos The invention may be embodied as a method for adaptive optimization of a serial database for queries including two or more operators. The method includes: searching query expression and parts of the expression in a saved queries results table; if expression found as a saved results key, fetching results from the table; and if saved result are found it might not include row ids that were loaded after the result was save in the table. Therefore, if the last row id in the result fetched from table is smaller than last row id committed, the method includes: fetching inverted indexes of the expression operators from the inverted indexes blocks. It is necessary to get only the part of the inverted index that contains row ids that are not in the saved result. This can be achieved by fetching only from inverted indexes blocks at which the last row ids is greater than saved result last row id; executing the Boolean operation over the fetched inverted indexes; gluing or merging results from the saved results with the updated results that include the newer row ids; updating saved results table with the merged result; and using merged result as expression result. The query execution continues, each expression in the saved results are searched, and if not found fetch it in the standard method via the inverted indexes. There are cases where expressions and results might be saved in saved results table: when query execution completed and query expression is likely to be repeated in future queries, for example if expression contains small number of common operators; when query execution completed and part of the query expression is likely to be repeated in future queries, for example if expression part contains small number of common operators. saving only the relevant part; if query or expression are expected to be commonly used; and if expression contains low cardinality operands.

The invention may be embodied as a method of reordering a serial data storage in a column data storage to enable more efficient data access and data fetch in some queries. The method includes: waiting for the current data block to be fully committed; compressing each value of each column by SHB compression method using the per column fields SHB as a compression map, wherein the compressed value of each key id is the serial number of this key id in the fields SHB; saving compressed bits vector in memory; for each predefined number of key ids added to the compressed bits vector, saving the vector a file; after all the rows in a data block are processed into compressed column store vectors, storing the column store vectors to disk; and deleting the current data block from memory if it is not used by another procedure running in parallel such as the index creation procedure.

BRIEF DESCRIPTION OF THE DRAWINGS

Various embodiments are herein described, by way of example only, with reference to the accompanying drawings, wherein:

FIG. 3A is a preferred embodiment on the inventive data structure.

DETAILED DESCRIPTION

The present invention aims to overcome the deficiencies of prevailing data warehouse technologies by providing a revolutionary DBMS (Database Management System) technology that enables extremely rapid real time search and analytics over enormous volumes of aggregated data streaming in high rate. The new DBMS technology provides is a complete, effective and efficient solution to the big data challenge. It is an enabling solution that offers new capabilities through performance and capacity.

The new DBMS technology outperforms leading industry management tools with order of magnitude query performance, faster load rates, near zero analysis latency, fraction of hardware cost and linear scalability. Real time access to huge data volumes which is not a feasible option with legacy database and data warehouse tools can be made available with the new DBMS technology.

The new DBMS technology was designed to handle a specific task of providing real time intelligence over high streams of events. It provides an excellent and highly efficient platform for analytic data warehousing and is designed with a focus on the next generation data analytics needs.

The invention includes a data base management system with methods for loading, storing and accessing huge data sets efficiently. The system introduces a new data structure and a new type of index that enables fixed O(1) access time to elements in huge data sets while utilizing economic memory space requirements of ~O(n) where n is the size of the set, and a new compression method based on the invented data structure and index.

The inventive database management system is called a "serial database". The inventive data structure with its related algorithms is called "super hierarchical bitmaps (SHB)".

Super Hierarchical Bitmaps (SHB)
Standard Hierarchical Bitmaps (HB)

This explains the concept of hierarchical bitmaps. SHB is an improvement of the standard hierarchical bitmaps (HB).

A HB can be viewed as a sequence of bit vectors arranged in layers called levels. Each bit in each vector represents a range of k bits in the consecutive level bit vector. Let $l_n$ and $l_m$ denote the serial numbers of two levels starting from 0 for the top level and given that $l_m > l_n$. Let $v_n$ and $v_m$ denote the bit vectors for levels $l_n$ and $l_m$ respectively. Let $s_n$ and $s_m$ denote the size (number of bits) in $v_n$ and $v_m$ respectively. Each bit in vector $v_n$ represents a range of $k^{(l_m-l_n)}$ bits in $v_m$ and the size $s_m$ is equal to $s_n * k^{(l_m-l_n)}$.

Figure 1:
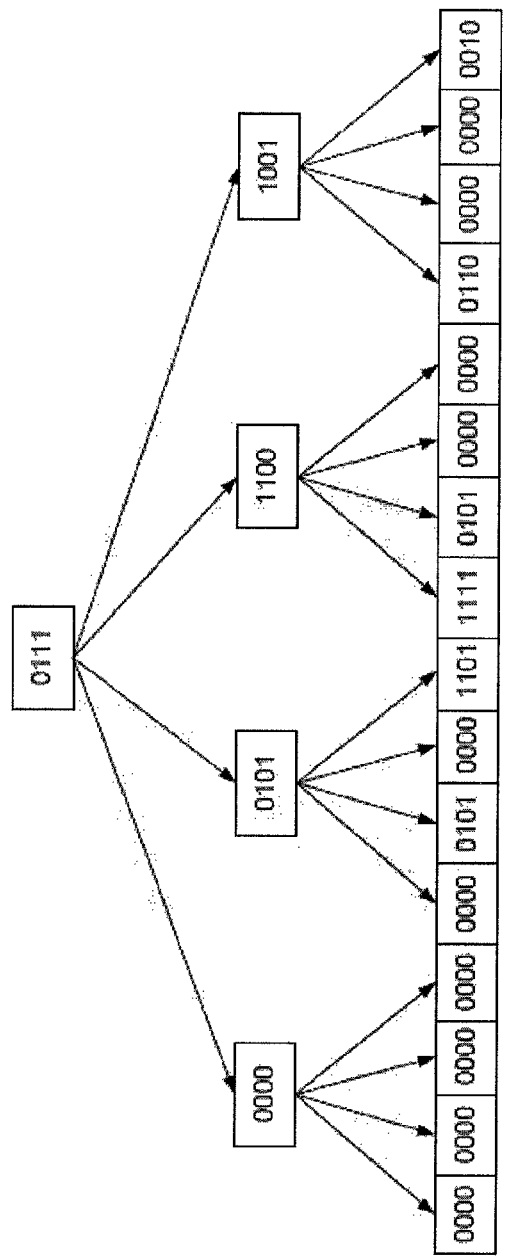
FIG. 1 is a prior art data structure.

FIG. 1 shows a hierarchical bitmaps example for L=3 and k=4.

Compressed Hierarchical Bitmaps (CHB)

Sparse sets will result in highly space consuming HB. Therefore a compression method is used that make HB an efficient method to maintain bits vectors in terms of space requirements. In a compressed Hierarchical Bitmap (CHB) we call a group of K bits a word. We call words that contain only zero bits empty word. Empty words are not stored in the bit vectors, resulting in much shorter bit vectors for sparse sets. The original position of each word is calculated according to the position of the bit representing this word in the previous level. The original position of each bit is calculated based on the position of the word in which the bit is set.

The set maximum value is determined by the number of levels in the CHB. Given number of levels L the maximum numeric value in the set is K^L. An index based on CHB is commonly a hybrid of CHB and another index structure such as a tree or a list to manage the CHB root nodes.

Figure 2:
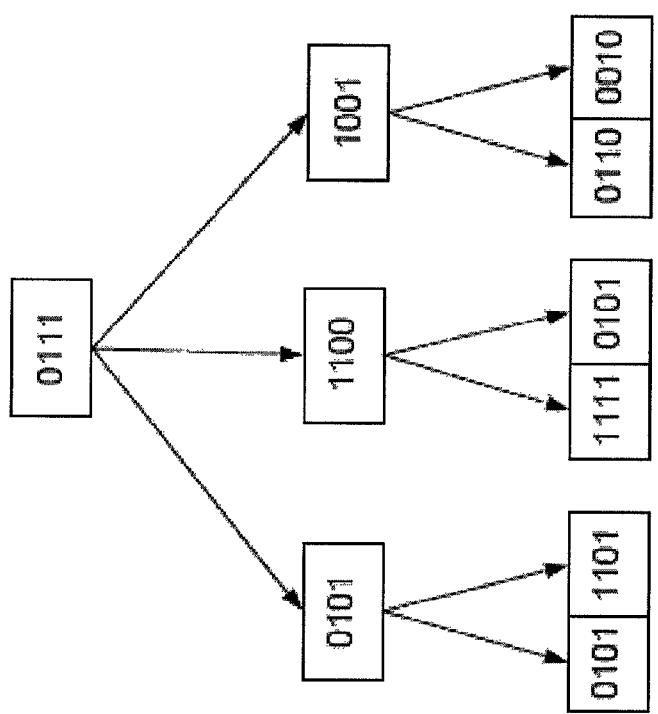
FIG. 2 is a prior art data structure.

FIG. 2 shows a compressed hierarchical bitmaps example for L=3 and k=4.

Usage of Compressed Hierarchical Bitmaps (CHB):

Adding a new element to the CHB representation of a set is efficient, providing two conditions are met: (1) the new element represents a numeric value greater than the numeric value of the highest value already in the set; and (2) the memory required for adding at most one additional word for each level bit vector is already allocated.

CHB is an efficient method for maintaining bit vectors that represent sparse sets. Space requirements for a set of n elements is less than 2*(n/k) words. CHB enables calculating sets union, sets intersection and sets difference over two or more CHB operators in order of ~O(n), given a small L (<100) and a big enough K (>4). It is done by execution of the set operation first over the top level word and then continues to the next level using only the words from each CHB operator that are represented by the result of the previous level operation and continue recursively for all words in all levels.

Limitations of CHB:

CHB does not provide an efficient method for search of a random element in the set and for fetching the serial number of a random element in the set. Search for random element is equal to intersection of CHB with a CHB that represents a set with the single search element (order of ~O(n)). Getting the serial number of a random element is done by first searching the set and then counting the bits in the last level preceding the searched bit.

The inefficiency of search operation generates inefficiency for adding a new element in the "middle" of the set (a new member value is lower than the set highest member value). Such operation requires a two-steps operation: first, searching for the expected location of the new member in the CHB, and second, if new words need to be inserted to the bit vectors then reallocation and memory coping are needed. Minimum order due to search order: ~O(n).

Super Hierarchical Bitmaps (SHB)

The super hierarchical bitmap is a novel data structure and related group of algorithms that can be used as a method for representing a set and as a base for very efficient indexing, hash and compression. SHB is an improvement of hierarchical bitmap.

The purpose of the SHB as part of the invention is to create a data structure that allows the following:
1. Fast ~O(n) creation from ordered set.
2. Fast ~O(n) sets manipulation (union, intersection and set difference).
3. Fast ~O(1) search of random element in a set.
4. Fast ~O(1) fetch of element sequential number in a set.
5. Economic memory space requirements: less than ~O(2 (n+2n/K))<O(3n) for K>4. Allows for maintaining data structure in a contiguous memory space.
6. Economic disk space requirements to reduced I/O operation for writing and reading the sets representation from disk while enabling quick conversion from the compressed disk format to the full in memory format.

Notes:
1. L is considered as a small value (<100) thus not effecting order: O(nL)~=O(n), O(L)~=O(1).

2. Max memory space is: O(2(n+n/K+n/K^2+ . . . +n/K^(L−1)))<O(2*(n+2n/K)<O(3n) for K>4

These attributes of the invention enable, but are not limited to, a new and very efficient index type, a new and memory efficient hashing method and a new compression method.

SHB Structure

Figure 3:
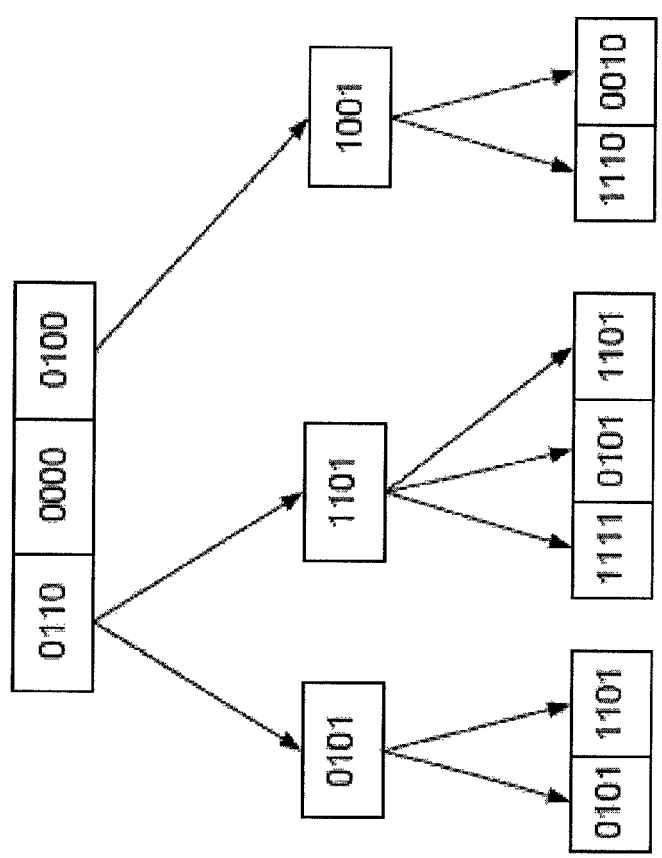
FIG. 3 is a prior art data structure.

FIGS. 3 and 3A show a super hierarchical bitmaps example for L=3 and K=4.

SHB data structure contains a bits vectors array and a counters vectors array. Unlike standard CHB the top level bit vector of SHB may contain more than one word and may contain empty words. Let $M_0$ denote the number of words allowed in the top level bits vector. The maximum numeric value of a SHB set member is calculated as: $M_0*K^L$. In some case, for a very sparse map, a linked list may be used to skip large gaps of empty words in the top level.

FIG. 3A shows a super hierarchical bitmaps example for L=3 and K=4 including counter vectors.

For each bits vector a counter vector is allocated accordingly. Counter vector members are integers. Counter vector size is equal to the number of words in each bit vector. Counter member max value must be greater or equal to maximum set size, which is equal to maximum set member value (SHB sets are composed of positive integer numbers). Each counter vector member holds a number that represents the total cumulative number of bits counted in each position of the SHB bit vectors starting from the first position of the bit vector. Let $B_{lx}$ be the number of bits in a word at position x at the bit vector of level l. Let $C_{lx}$ be the value at position x at the counter vector of level l. We calculate $C_{lx}=C_{lx-1}+B_{lx}$. Counter vector memory requirement reach $O(C*(2n/K))$ where C is the integer size where the maximum integer value is greater or equal to maximum possible number of bits in the bit vector Since SHB set may be used to represent very large sets the size of a counter must be big enough to represent very large number of bits, thus usually 32 bit or 64 bit integers are used.

In the example of FIG. 3A, the counter vectors are:
Level 0: [0],[2],[2],[3]
Level 1: [0],[2],[5],[7]
Level 2: [0],[2],[5],[9],[11],[14],[17],[18]

Calculation Example 1: Count total bits until position=7 at level=2 (not including last word):

Formula: $L[level][position]=L[2][7]=17$

Memory size of a counter vector can be reduced by the following optimization method: multiple counter vector layers are used for each bit vector, where each layer uses the next layer set as a base to calculate the cumulative counter.

With non-optimized counter vectors each member may contain a numeric value which can be up to the maximum number of bits in the bit vector. Therefore 4 byte or 8 bytes members are used. To reduce counters memory size requirement we allocate a counter vector with small size members, for example: 1 byte. We call this vector layer 1 counters. With smaller counters we can count the total number of bits within a small range of bit vector words. A 1 byte counter may count total of 256 bits which is equal to counting 256/K (256 divided by K number of bits) bit words. Denote W as the number of bit words that may be counted in such a vector. When the $W^{th}$ word is reached and needs to be counted we reset the counter to 0. We add another layer of bigger counters, for example 2 bytes counters. We call this layer 2. Layer 2 counts that total bits in each group of W words. The number of members in layer 2 vector is smaller than the number of member in layer 1 vector because layer 2 only counts total bits for the entire groups of W words and not for each word in the group. We can continue this with layer 3, with, for example 4 byte words, which would count only the total bit in groups of W^2 words, etc. To calculate the total bits for a word in position X of the bit vectors we sum the total counters from layer 1 at position X+layer 2 at position X/W+ layer 3 at position X/W^2 etc. . . .

In the example of FIG. 3, the optimized counter vectors are:
Level 0, Layer 1 (member size 4 bits): [0],[2],[2],[3]
Level 0, Layer 2 (member size 8 bits): [0],[7]
Level 1, Layer 1 (member size 4 bits): [0],[2],[5],[7]
Level 1, Layer 2 (member size 8 bits): [0],[14]
Level 2, Layer 1 (member size 4 bits): [0],[2],[5],[9],[0],[3],[6],[7]
Level 2, Layer 2 (member size 8 bits): [0],[11],[18]
Calculation Example 2: Count total bits until position=7 at level=2 (not including last word):

Formula: $L[level].Layer2[position/4]+L[level].Layer1[position]=$ $L[2].Layer2[7/4]+L[2].Layer1[7]=$ $L[2].Layer2[1]+L[2].Layer1[7]=11+6=17$ Operations Over SHB
Create SHB from Ordered Set=SHB Create Function In this operation ordered set of numbers is converted to SHB data structure. We need to calculate the positions of the bits representations of the set members in each SHB level and then to calculate the SHB counters. The following procedure requires that set members are added to SHB by order (smallest to largest).

Let U be the set member, let K be SHB word size and L be number of SHB levels. We denote $W_l$ to be the position of the bit vector word in bit vector $V_l$ at which the bit is to be set at level l and $B_l$ to be the position of the bit within the word $V_l[W_l]$. We denote $R_l$ to be the virtual position of U in level l. The virtual position is the position of the bit vector word at which the bit would have been set if the level bit vector would have been a standard uncompressed bit vector. Let $T_l$ be a counter of the total number of set bits in level l.

Since level 0 is in fact a standard uncompressed bit vector we start by setting $W_0$ as follows:

$W_0=(U-1)/K^L$

Following this, for each level l we calculate:

$R_{l+1}=(U-1)/K^{(L-(l+1))}$ $B_l=R_{l+1}\%K$ $V_l[W_l]=V_l[W_l]|2^{B_l}$ (the operation | represents logical OR operation. Executing OR with $2^{B_l}$ sets the bit $B_l$ in bit vector word $V_l[W_l]$ to 1)
if $V_l[W_l]$ changed then $T_l=T_l+1$ (we increate the counter only if number of bits in the word changed—that is a bit that was unset before is now set to 1)
$W_{l+1}=T_l-1$ (for level 1 and up the position of the word depends on how many bits were set in previous upper level, as each set bit in level l−1 represents a none empty word in level l)

Once all set members were added to SHB we calculate the SHB counters. Let $C_l$ be the bits counter vector for level l. For each level l we fetch all words in the $V_l$ bit vector sequentially. Let n be the word position counter in bits vector $V_l$, we set:

$C_l[0]=0$

And, for each word number n in vector $V_l$:
$C_l[n+1]=C_l[n]+countBits(V_l[n])$ (countBits be a function that get bit vector word and return the number of set bits in the word).

SHB counters may be saved in memory optimized layers vectors as explain above.

EXAMPLE

Populating an empty SHB where L=3 and K=4 with new member 5 and 10.
(Note: in this example the least significant bit is on left end of the bit vector word)
Adding a new member U=5

| L | $R_{l+1}$ | $W_l$ | $B_l$ | $V_l[W_l]$ | $T_l$ | $V_l[\ ]$ |
|---|---|---|---|---|---|---|
| 0 | 0 | 0 | 0 | 1000 | 1 | [1000] |
| 1 | 1 | 0 | 1 | 0100 | 1 | [0100] |
| 2 | 4 | 0 | 0 | 1000 | 1 | [1000] |

Adding a new member U=10

| L | $R_{l+1}$ | $W_l$ | $B_l$ | $V_l[W_l]$ | $T_l$ | $V_l[\ ]$ |
|---|---|---|---|---|---|---|
| 0 | 0 | 0 | 0 | 1000 | 1 | [1000] |
| 1 | 2 | 0 | 2 | 0110 | 2 | [0110] |
| 2 | 9 | 1 | 1 | 0100 | 1 | [1000] [0100] |

Counting the bits:

| L | $C_l[\ ]$ |
|---|---|
| 0 | [0] [1] |
| 1 | [0] [2] |
| 2 | [0] [1] [1] |

Create SHB From Simple Bits Vector

In this case the original set is represented by a bit vector. Concept is similar to creating from ordered set but some shortcuts may apply: the last SHB level is not calculated because the none empty words in the simple bits vector are identical to the words of the last SHB level. The procedure can be described as follows: For each word W in simple input bit vector B,
If W is not empty
Set its representing bit in level 0 according to bit position in bit vector B
Set its representing bits in all levels except 0 and last level calculated based on non empty words counter
Set: last level next word=W
Search SHB=SHB Search Function We calculate the expected positions of the bits representing the searched value in each level of the SHB. If all expected bits are set the search options returns true.

Let U be the searched value. Let K be SHB word size and L be number of SHB levels. We denote $W_l$ to be the expected position of the bit vector word in bit vector $V_l$ at which the level l bit for U is expected to be set and $B_l$ to be the position of that bit within the word $V_l[W_l]$. We denote $R_l$ to be the virtual position of U in level l. The virtual position is the position of the bit vector word at which the expected bit would have been set if the level bit vector would have been a standard uncompressed bit vector.

Since level 0 is in fact a standard uncompressed bit vector we start by setting $W_0$ as follows:

$$W_0 = (U-1)/K^L$$

Following this, for each level 1 we calculate:

$$R_{l+1} = (U-1)/K^{(L-(l+1))}$$

$$B_l = R_{l+1} \% K$$

If not $(V_l[W_l] \ \& \ (2^{B_l}))$ then return false (the operation & represents logical AND operation.

Executing AND with $2^{B_l}$ check the bit $B_l$ in bit vector word $V_l[W_l]$. If AND operation result is false then U is not a member of the SHB set)

$W_{l+1} = C_l[W_l] + \text{countLeftBits}(V_l[W_l], B_l)$ (CountLeftBit—count how many bits are set to the left of bit number $B_l$)

If l=last level then return true—if we reached the last level it means that all expected bits are set, therefore U is a member of the SHB set.

Get Serial Number of SHB Member
GetSerialNumber(SHB, Member)

Procedure is the same as search with one difference: if all expected bits were set and last level reached, instead of returning true to indicate that U is in set do:
return $C_l[W_l] + \text{countLeftBits}(V_l[W_l], B_l) + 1$ This is the serial number of the set member U is the SHB.

Examples

Searching and getting serial number from SHB where L=3 and K=4.
(Note: in this example the least significant bit is on left end of the bit vector word)
The searched SHB members are [5], [10]. The SHB:

| L | $V_l[\ ]$ | $C_l[\ ]$ |
| --- | --- | --- |
| 0 | [1000] | [0] [1] |
| 1 | [0110] | [0] [2] |
| 2 | [1000] [0100] | [0] [1] [2] |

Search if SHB has a member U=6 (false result is excepted)

| L | $R_{l+1}$ | $W_l$ | $B_l$ | $V_l[W_l] \ \& \ 2^{B_l}$ | Return |
| --- | --- | --- | --- | --- | --- |
| 0 | 0 | 0 | 0 | 1000 & 1000 = true | No |
| 1 | 1 | 0 | 1 | 0110 & 0100 = true | No |
| 2 | 5 | 0 | 1 | 1000 & 0100 = false | False |

Get serial number of SHB member U=10:

| L | $R_{l+1}$ | $W_l$ | $B_l$ | $V_l[W_l] \ \& \ 2^{B_l}$ | Return |
| --- | --- | --- | --- | --- | --- |
| 0 | 0 | 0 | 0 | 1000 & 1000 = true | No |
| 1 | 2 | 0 | 2 | 0110 & 0010 = true | No |
| 2 | 9 | 1 | 1 | 0100 & 0100 = true | 2 |

Additional operations over SHB:
GetFirstMember, GetNextMember, GetLastMember, GetPreviousMember The algorithms for the Get operations use position counters for each word in the words bit vectors and for each bit within current word, and increase or decrease their values in each step according to the direction of the Get operation.

Set intersections, set union, set difference
Algorithms are similar to intersection, union and difference operation over CHB with one difference: when counting of total bits at a certain position in a words bit vector is required counter vector are used, thus reducing the bits count operation costs.

Implementing Efficient Index Using SHB
SHB index guarantees O(1) search time regardless of index size. The preferred methods to efficiently create SHB index from an unordered vector or pairs (key, value) and the method to add members to SHB index and search SHB index are described as follows:

Creating the index—Alternative 1
1. Index pairs (set members, mapped values) are inserted to a tree or sorted list format, thus—the set becomes an ordered set
2. The ordered set is converted to SHB index using SHB Create.
3. Allocate new vector for mapped values. Size of vector=size of set
4. For each pair (member, mapped value) in the ordered set fetch by order:
pair←get next pair from ordered set by order
ValuesVector[n]=pair.value
n=n+1

Creating the Index—Alternative 2
1. Index keys (set members) are inserted to an uncompressed bits vector. The set becomes an ordered set without sort. Uncompressed bit vector must be large enough to contain the set
2. The uncompressed bit vector set is converted to SHB index using SHB Create From Simple BitVector
3. Allocate new vector for mapped values. Size of vector=size of set
4. For each pair (member, mapped value) in the original unordered set:
SerialNo←GetSerialNumber(SHB, pair.member)
Values Vector[SerialNo−1]=pair.value Adding New Members to the Index
1. To add additional members to the index: collect new pairs in unordered vector set format. Upon reaching a predefined threshold convert unordered vector to SHB index+values vector
2. Merge new SHB index with existing SHB index (operator OR) and merge existing and new mapped values vectors to vectors ordered by the merged SHB index members order Search SHB Index
To find value V for set member M in SHB index:
SerialNo←GetSerialNumber(SHB, M)
V←Values Vector[SerialNo−1]

Example of SHB index:
Original set of mapped values: [10→A],[1→],[15→C], [12→D],[8→E],[11→F],[4→G],[5→H]
SHB bit vectors and counters (3 levels, 4 bits word):
Level 0: 1000 [1]
Level 1: 1111 [4]
Level 2: 1001 [2] 1001[4] 0111[7] 0010[8]
Values vector: [B],[G],[H],[E],[A],[F],[D],[C]←(note: first position is 0)
Search example: find the mapped value for key 12
serialNo←getSerialNumber(SHB, 12)=7
V←Values Vector[serialNo−1]=valuesVector[7−1]=valuesVector[6]=D Implementing Low Size Memory Efficient HASH Using SHB Creating the Hash Assuming keys collection K of size M. Keys in the set are hashed with hash function $f$ to numeric values within the predefined large range. If key hash value already exists rehash until unused hash value is found. The keys and their hashed values are collected in vectors so that the position of key k in keys vector K is equal to the position of its hashed value in the hashed values vector H, i.e. $H[m]=f''(K[m])$. Hashed values vector is converted to SHB. Create positions vector V as follows: for each member H[m] in H let s be the serial number of H[m] in the SHB set (s=getSerialNo(SHB, H[m])) and determine V[s]=m. This means that if k is in K there exists n that denotes number of hashes based on $f$ starting from 1 so that $K[V[getSerialNo(SHB,f''(k))]]=k$.

The formed structure is now a SHB index in which hashed value are the index keys and the positions of the hashed keys in the keys vector are the mapped values.

To check if a key k is in the hash, k is hashed to a hash value which is searched via SHB index search. If the hash value is found in the index, then the key is compared to the mapped value, and if the mapped value is not equal to the key, then the key is rehashed and search is repeated until match is found or until the hash key is not found in the index.

If the hash key is not found in the hash index it may be added to the SHB hash by adding the new key to keys array K, adding it's hash value to the SHB index and inserting its position in K to the appropriate position in V. For more efficient hash update it is suggested to avoid adding single keys to the hash and instead to collect several such new keys to collection K' of predefined size M' and merge the entire new collection into the hash structure.

Formalization:

Let M donate the size of keys collection K to be hashed. Let $k_m$ be a key in collection K. Let function F(k) return a unique numeric hash value (rehash may be used to gain uniqueness) between 1 to N where N may be a very large number. Let $h_m$ be the hash key of key $k_m$. Let H denote the set of hashed keys. The size of set H is equal to the size of K keys collection.

Let S denote the SHB index created from set H and let V denote the vector of positions of keys in collection K ordered by hash keys sequential order so that if $h_m=F(k_m)$ and s=getSerialNo(S, $h_m$) then $K[V[s]]=k_m$.

EXAMPLE

Keys collection K of size 8: ([k0], [k1], [k2], [k3], [k4], [k5], [k6], [k7])

Matching hash keys set H: ([10], [12], [5], [11],[8], [1], [15], [4])←i.e: 10=F(k0), 12=F(k1), etc. . . . )

SHB bit vectors and counters (3 levels, 4 bits word):
Level 0: 1000 [1]
Level 1: 1111 [4]
Level 2: 1001 [2] 1001[4] 0111[7] 0010[8]
SHB members and their serial numbers: 1(1), 4(2), 5[3], 8(4), 10(5), 11(6), 12(7), 15(8)
Values vector V: [5],[7],[2],[4],[0],[3],[1],[6]←(note: first position is 0)
Check if k1 in hash:
if k1=K[V[getSerialNo(SHB, F(k1))-1]]→if k1=K[V[get-SerialNo(SHB,12)-1]]→if k1=K[V[7-1]]→if k1=K[V[6]]→if k1=K[1]→if k1=k1→true Implementing Compression Using SHB SHB compression is for arrays of positive numeric values. The compression process converts an array of numbers, usually kept as 32 bit or 64 bit each, to an array of compressed values. The original values are placed in SHB and their serial numbers in the SHB are used as their compressed representation. Since the SHB serial numbers are sequential the number of bits required to represent the compressed values is equal to log 2 of the number of unique values in the array, which is likely to be significantly smaller than the original 32 or 64 bits. The compressed values occupy a smaller number of bits than the original values. The values in the compressed array maintain their relative position.

The SHB compression enables extraction of the original value according to the value position in the original array in O(1) time while decompressing only the extracted value.

The compression procedure is as follows:
1. Convert the array of numeric values to be compressed to SHB set representation. This SHB set may be called the SHB compression map
2. Determine the number of bits representing each value in the compressed array.
   bitsSize←Log 2(size(SHB))
   Note: size of SHB set is equal to number of unique values in the original array.
3. To generate the compressed array:
   For each numeric value in the original array
   compressedValue←GetSerialNumber(SHB, Value)−1
   concatenate(compressedBitsVector, compressed Value)
4. Prepare reverse index for decompression:
   For each member in SHB set (read in sequential order)
   ReverseIndex[counter++]=member
   To fetch the original value of an element by its position in the original vector:
   compressed Value←getbits(compressedBitsVector, position*bitsSize, bitsSize)
   original Value←ReverseIndex[compressedValue]
Note: getbits(bitsVector, pos, len)→return len bits from bits Vector starting from position pos Example of SHB Compression:
Original array: ([10], [15], [12], [1], [8], [12], [10], [11], [4], [5])
SHB bit vectors and counters (3 levels, 4 bits word):
Level 0: 1000 [1]
Level 1: 1111 [4]
Level 2: 1001 [2] 1001[4] 0111[7] 0010[8]
Total number of unique values: 8
Number of bits representing each compressed value=log 2(8)=3
Reverse index: ([1], [4], [5], [8], [10], [11], [12], [15])
Compressed representation: 100 111 110 000 011 110 100 101 001 010
Translation of original values to compressed bits representation according to SHB serial number: 1→[000], 4→[001], 5→[010], 8→[011], 10→[100], 11→[101], 12→[110], 15→[111]

Serial Database

Figure 4:
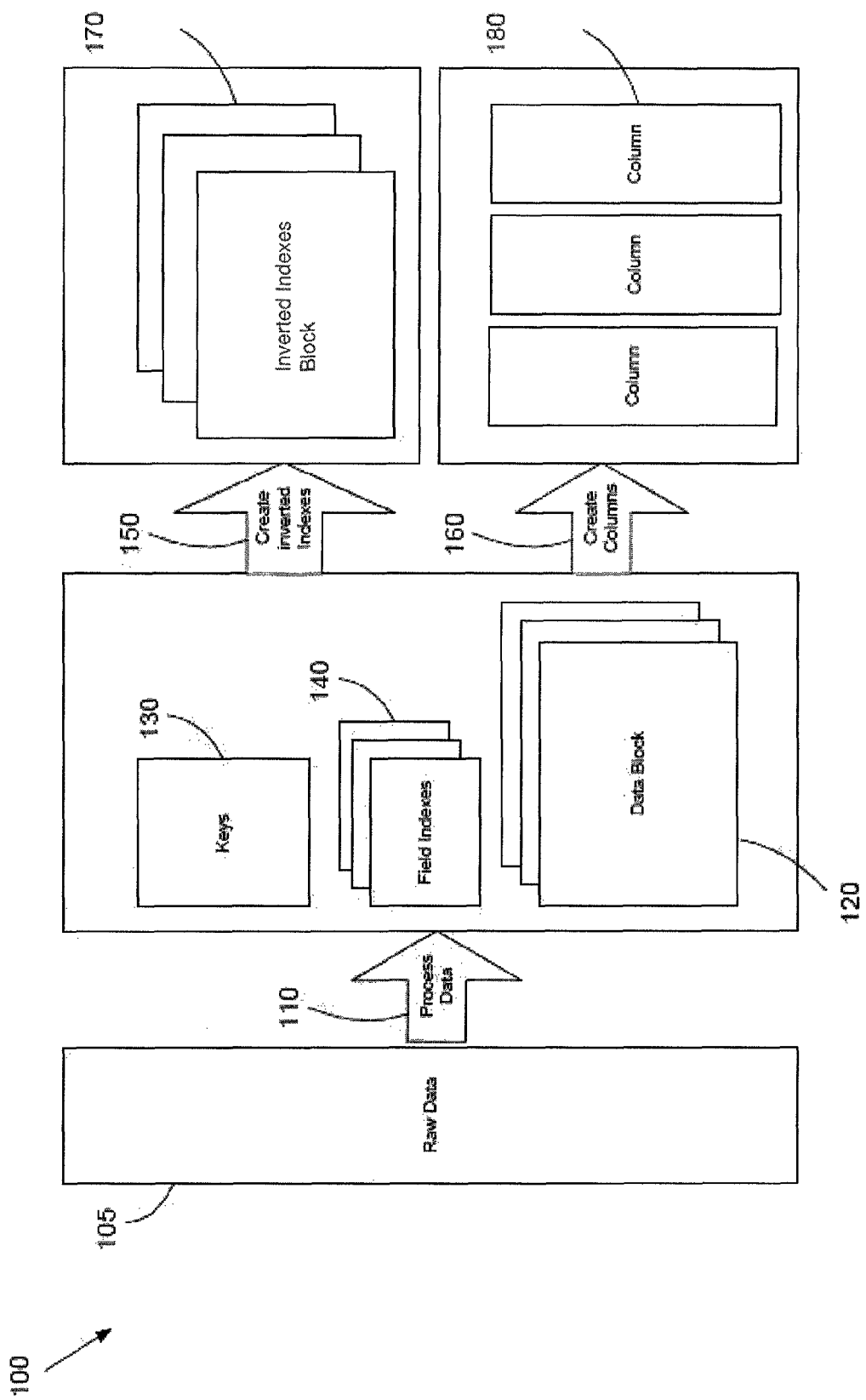
FIG. 4 is a a schematic block diagram showing the system 100.

FIG. 4 is a schematic block diagram showing the system 100 comprising a raw data stream 105 provided to the system via a data processing module 110, data blocks 120, fields indexes tables 140 and a keys table 130, as will be explained in detail below, an index creating process 150 and a columns creating process 160, for transforming the data blocks 120 and tables (130,140) into index blocks 170 and data columns 180, as will be explained in detail below.

Schema:

A schema is provided describing the data base data schema, tables and columns, and the format and structure of the raw data to be loaded into the data base management system.

Data Blocks:

A data block 120 is a pre allocated memory block that contains a set of records in encoded format, where raw data values are encoded to numbers. The code is called key id. Key id size is fixed and predefined (usually 4 or 8 bytes per id) and therefore the size of a record in the data block is fixed. The original raw data records are converted to vectors of key ids and placed in the data block in a serial order (i.e. a loading order). The number of records in a data block is predefined and therefore the data block size can be pre-calculated and pre-allocated in memory as one contiguous memory block. Data blocks are dumped to the disk, as will be explained in detail below.

Keys:

A single keys table 130 stores all the unique keys (i.e. one unique instance of each key id) created by the data processing module. Each unique value may be encoded to a unique numeric value called key id. Encoding of an integer or real number is a reversible function returning a unique integer per unique value (for example: where the unique integer is equal to the unique value plus a predetermined constant [the constant can be negative or positive, e.g. if the original value is 175 and the predetermined constant is 5, then the key id for this value would be 180]). Encoding of a string returns a sequential number. One unique instance of each string is stored in the keys table. The sequential position (i.e. a specific value) of the stored string—in the string table—is the value of the key id of that string. String to number indexes are stored in SHB hash, thus allowing O(1) search time. Other non-integer data types (e.g. a date data type etc.) may be encoded with one of the above two methods. In cases where key ids are assigned without a reversible function, a table—mapping key ids to values—is kept in memory and stored on disk whenever a commit is executed. SHB hash or SHB index may be used to fetch key id by value.

Field Indexes:

Fields indexes table 140 is built for each data block 120. The fields indexes hold the unique keys of each column in a data block in SHB format. Fields indexes may also include counters for number of occurrences of each key in the data block as mapped values to SHB index. In the fields creation process key ids are added to a per columns index tree. The index holds the unique keys and the counter of number of occurrences of each key in the data block as a mapped value. In case the number of unique values is greater than a predefined threshold, the tree structure is no longer used to build the indexes. Instead the list of key ids is kept in a vector, no counters are kept and values may appear more than once in the vector. When all keys ids per data blocks are collected to the tree index or to a vector it is converted to SHB format and the occurrences if exists is kept as SHB index mapped values vector.

Inverted Indexes Block:

Inverted index block is composed of unique keys index per column and an ordered list of row ids per unique key indicating the location of the key's original record in a data block. The fields SHB index that contains the unique keys per column is used as the unique keys index. The ordered lists of rows ids are generated as vectors but may be converted to a more efficient CHB format given that vector size is bigger than a given threshold.

The inverted indexes are created by fetching data block rows sequentially and storing the row id in vectors related to the key ids from the row. The creation process uses a pre-allocated inverted index memory blocks. An inverted index memory block is composed of per column vectors. The vectors are allocated according to the total number of occurrences calculated when generating the field index in the data processing step, assuming that the exact number of occurrences for each key is known—i.e. a tree index was used to build the field index. Otherwise, if a list was used, allocation is done by estimation based on average inverted index size and the number of unique keys.

Populating the inverted indexes vectors is done by calculating the relative positions in the inverted indexes vectors according to the serial number of the key in the fields SHB indexes.

In case estimated allocation was used, then populating pre-allocated inverted indexes vectors is done by calculating position in the vector using the serial number of the key in the SHB index multiplied by estimated average inverted index vector size. In case the estimated pre-allocated space per key is not sufficient to hold the inverted index of a specific key, a temporary tree index mapped to temporary vectors is used to complete the pre-allocated vectors.

If size of row ids list is greater than a given threshold the list may be converted to CHB. This can be checked while populating the inverted indexes vectors or after all the records in the block were processed.

Example of Inverted Indexes Creation in a Pre Allocated Vector

Field index set (unique key id values) and counters (number of occurrences):
1 [5], 4 [2], 5 [1], 8 [1], 10 [3], 11 [2], 12 [3], 15 [1]
SHB bit vectors and counters (3 levels, 4 bits word):
Level 0: 1000 [1]
Level 1: 1111 [4]
Level 2: 1001 [2] 1001 [4] 0111 [7] 0010 [8]
Positions vector: [0], [5], [7], [8], [9], [12], [14], [17]←Act as SHB index values vector
Size of allocated inverted index vector: 18 (total number of occurrences)
Step 1: Adding value U1 to inverted index of key 10:
serialNo←getSerialNo(SHB, 10)=5
position←positionsVector[serialNo−1]=positionsVector[5]=9
InvertedIndexVector[position]=invertedIndexVector[9]←U1
InvertedIndexVector→[ | 0,0,0,0,0 | 0,0 | 0 | 0 | U1,0,0 | 0,0 | 0,0, 0 | 0 | 0]
positionsVector[serialNo−1]←positionsVector[serialNo−1]+1
Positions Vector→[0,5,7,8,10,12,14,17]
Step 2: Adding value U2 to inverted index of key 10:
serialNo←getSerialNo(SHB, 10)=5
position←positionsVector[serialNo−1]=positionsVector[5]=10
InvertedIndexVector[position]=invertedIndexVector[10]←U2
InvertedIndexVector→[ | 0,0,0,0,0 | 0,0 | 0 | 0 | U1,U2,0 | 0,0 | 0, 0,0 | 0 | 0]
positions Vector[serialNo−1]←positionsVector[serialNo−1]+1
Positions Vector→[0,5,7,8,11,12,14,17]

Creating a Database:

FIGS. 5 through 8 are flowcharts showing the sequence of steps for creating a database or adding data to an existing database according to the present invention.

Figure 5:
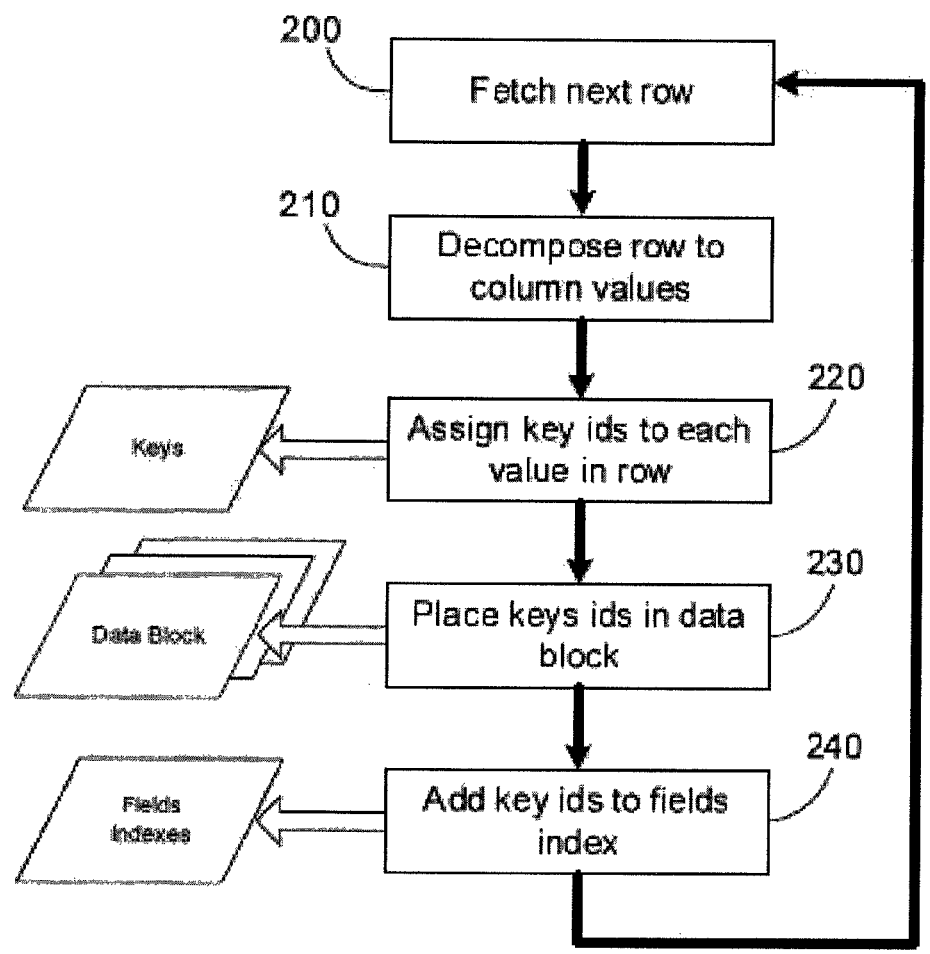
FIG. 5 is a flowchart detailing steps for creating a database according to the present invention.

FIG. 5 shows the acquisition of raw data. In step 200 the system waits for a batch of records to be forwarded after fetch. Raw data 105 is provided as stream of raw records to the loader process 110.

Raw data 105 may also include loading instructions such as commit or delete. In step 210 each record in the batch is decomposed to separate column/field values, based on the data scheme. In step 220 key ids are assigned to each value in a row, as described above. One instance of each key id is stored in the keys table 130. In step 230 the assigned key ids are placed sequentially in the current data block 120. A new data block is allocated when the current record serial number, also called row id, exceeds the last record serial number that can be stored in previously allocated blocks. In step 240 the key ids are added to the current field indexes table 140, as described above.

Figure 6:
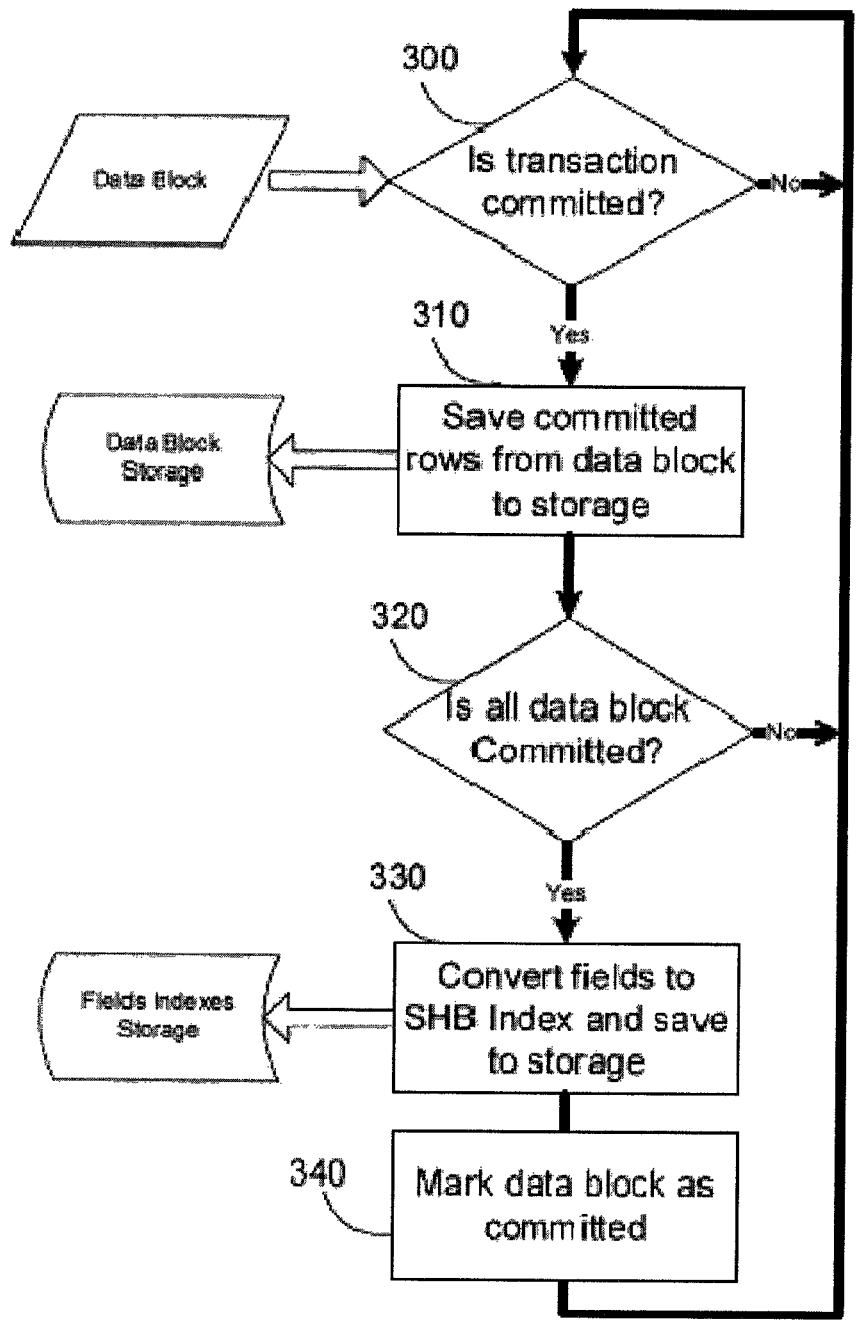
FIG. 6 is a flowchart detailing steps for creating a database according to the present invention.

FIG. 6 shows a process that may run in parallel to the process of FIG. 5, where the system checks whether the current transaction is committed. The serial number of the last processed row is monitored to check when this number is greater or equal to next serial number to commit Determining the next serial number to commit can be done either by checking the serial position of the next commit instruction in the raw data stream or by setting fixed auto commit transaction size and calculating next serial number to commit=last serial number committed+transaction size. A commit action is executed once the processing of all rows in a transaction is completed, i.e. when the data processing thread completed the processing of all the rows in the transaction and those rows are now placed in a data block. Committing means saving the committed rows from the data block to the hard disk. In step 300 the system waits for the current transaction to be committed. If it is committed, the committed rows from the data block are saved to disk in step 310. In step 320 the system checks whether all the data in the current data block has been committed and returns to step 300 if not. In step 330, if it was determined that the entire data block has been committed, the field indexes 140 of the data block 120 are converted to SHB indexes, as described above, and saved to indexes storage 170 on disk. Once writing to the disk is completed successfully and sync is confirmed the system may send acknowledgment that the commit is completed. In case the committed rows range is the last range in a data block the data block is marked as a fully committed data block in step 340.

Figure 7:
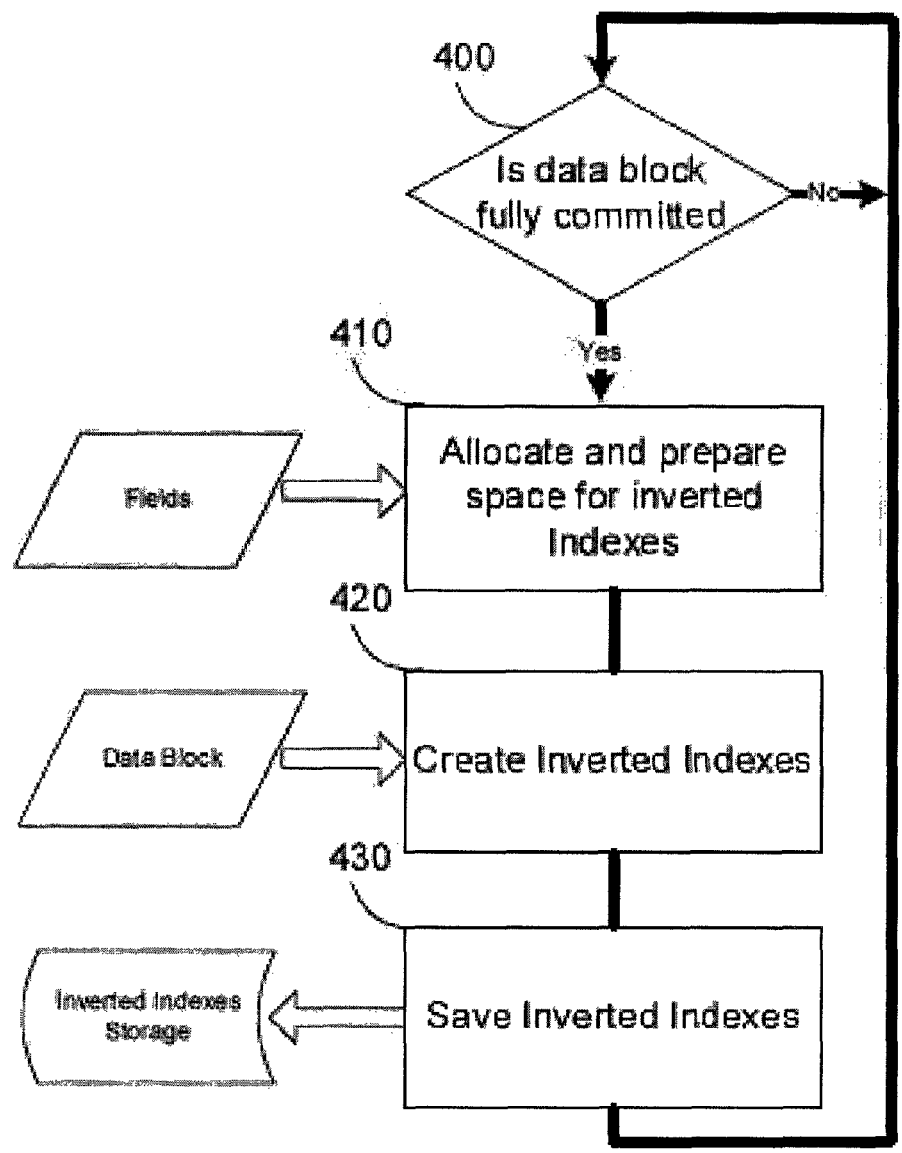
FIG. 7 is a flowchart detailing steps for creating a database according to the present invention.

FIG. 7 shows a process that may run in parallel to the processes of FIGS. 5 and 6, where the system checks whether the current data block is fully committed. In step 400 the system waits for the current data block 120 to be fully committed. In step 410, when it was determined that the current data block is fully committed, memory is allocated for inverted indexes block, as described above. In step 420 the inverted indexes are created from the current data block, as described above. Once all inverted indexes per current data block have been created the inverted indexes block is saved to the disk in step 430, along with a file positions vector that contains inverted index vectors position in the inverted index file. The file positions vector is ordered by key ids.

Once all the rows in a data block were processed into inverted indexes and the inverted indexes block was saved successfully to disk the data block may be deleted from memory if it is not used by another procedure running in parallel such as the alternative store creation procedure.

The position of any inverted index vectors can be later fetched in O(1) time by using SHB getSerialNumber function over the fields SHB that was already created in the commit step. The getSerialNumber function returns the serial number of a key which matched the position in the file positions vector that holds the file position of the inverted index.

Figure 8:
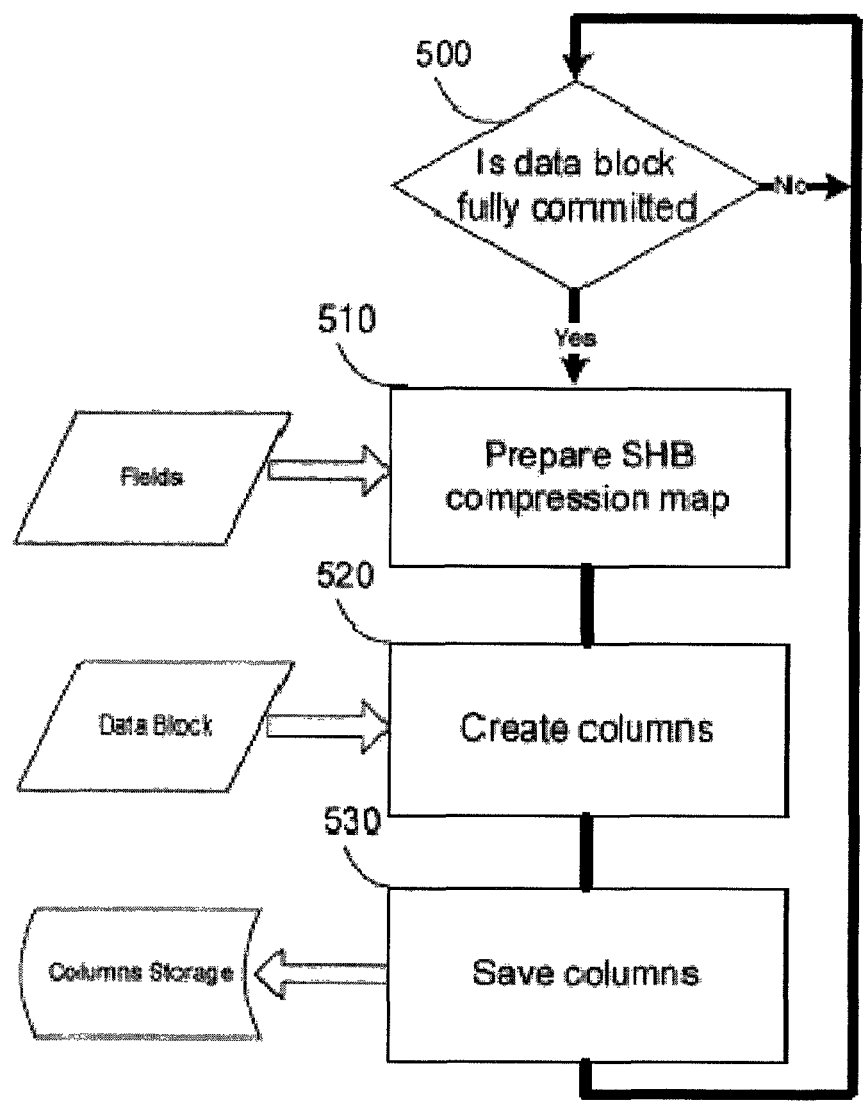
FIG. 8 is a flowchart detailing steps for creating a database according to the present invention.

FIG. 8 shows a process that may run in parallel to the processes of FIGS. 5, 6 and 7, where data is stored in another storage method in addition to the data blocks rows serial storage described above. The purpose of this process is to create alternative data access methods that are more efficient for the execution of certain types of queries.

The alternative storage method may include (but is not limited to) column store. The method described herein explains the creation of alternative store methods that may be generated from sequential reading of the loaded data blocks, such as column store.

The following describe in details creation of column store:

In step 500, the system waits for the current data block to be fully committed. In step 510, the process of creating compressed column store from data block begins when it has been determined that the current data block has been fully committed. The columns are compressed by SHB compression method using the per column fields SHB created in the step 330 as a compression map. The compressed value of each key id is the serial number of this key id in the fields SHB.

The rows are fetched sequentially from the data block. Each value of each column in each row is compressed by SHB compression and saved in compressed bits vector in memory (step 520). For each predefined number of key ids added to the compressed bits vector the vector is saved to a file in step 530. A check point is used to keep the sequential number of the last value saved successfully. Once all the rows in a data block were processed into compressed column store vectors the column store vectors are stored to disk in step 530 and the current data block may be deleted from memory if it is not used by another procedure running in parallel such as the index creation procedure.

The sequential number or row id of the last row stored in the alternative store is always less than or equal to the row id of the last row committed in the database. Therefore the querying method must use the alternative store check point to determine which values may be fetched from the alternative store files and which values may only be fetched from the data blocks.

Deletions and Updates

In certain scenarios a transaction may include a row delete instruction or one or more column values update for a row. The delete or update instruction may be part of an inserted rows batch or may be sent separately. If the scheme includes unique keys, then in the case that a unique key of a row within rows batch is equal to a unique key of a row already inserted in the system the row is considered an update row. Unique key check is done by searching the merged fields SHB index per key.

Handling Delete:

1. Fetch the row id(s) of the rows to be deleted. This is done by executing a query based on the delete instruction filter condition. Row ids set is returned from the query as CHB.
2. When the transaction containing delete instruction is committed then lock and fetch the deletion map. The deletion map is a CHB format set of rows ids that were deleted from the database. Lock is used to prevent queries execution during the update of the deletion map.
3. Merge the newly deleted rows ids set (in CHB format) with the deletion map set (in CHB format) by executing OR operation over CHB.
4. Replace the previous deletion map with the new deletion map. Confirm commit of delete operation. Unlock delete map.

Handling Update (Also, but not Limited to, as Part of Records Batch):

1. Fetch the row id(s) of the rows to be updated. This is done by executing a query based on the update instruction filter condition. Row ids set is returned from query as CHB. New row ids are allocated to the rows containing the updated values as if they were regularly inserted rows 2. When the transaction containing update instructions is committed then lock and fetch the deletion map. The deletion map is a CHB format set or rows ids that were deleted from the database. Lock is used to prevent queries execution during the update of the deletion map.
3. Save the rows with the updated values in the normal process as part of the data block containing inserted rows.
4. Merge the original rows ids set of the updated rows (in CHB format) with the deletion map set (in CHB format) by executing OR operation over CHB.
5. Replace the previous deletion map with the new deletion map. Acknowledge commit of the records batch. Unlock delete map.

Querying:

A search for records where the condition is that column C is equal to a value V is conducted by:
- A) For each inverted index block:
  - a. Find key V in column C inverted index keys. Get mapped value which is the position on the inverted index record in the inverted index block
  - b. Fetch inverted index record from inverted index block
  - c. If inverted index record is not in CHB structure convert in memory to CHB format
- B) Merge inverted index CHB sets from all blocks to a single CHB result set
- C) In case deletion map exist fetch deletion map and execute the Boolean operation NOT between the result CHB and the deletion map CHB
- D) The result CHB is a set containing serial numbers of the records (row ids).
- E) If records are requested records are fetched from serial storage or alternative storage by position. Records position is calculated according to row id.
- F) Some aggregation functions such as count of number of records fulfilling the condition are calculated from the result CHB structure A search for complex expression with two or more operands using AND, OR and NOT operators is done by executing the relevant Boolean operation over two or more inverted indexes in CHB format:
- A) Fetch inverted indexes of each operand as described above in method for search phases A and B and place the inverted indexes in a stack
- B) Fetch inverted indexes from the stack and execute the condition Boolean operations between the inverted indexes in CHB according to the expression condition
- C) In case deletion map exists fetch deletion map and execute the Boolean operation NOT between the result CHB and the deletion map CHB
- D) The resulting CHB is read as a list of record ids containing serial number of records (row ids)
- E) Records are fetched from storage by position if required
- F) Some aggregation functions such of count of number of records fulfilling the condition are calculated from the result CHB structure A search over a range of record where the condition is that column C is either greater than, greater equal than, smaller than or smaller equal than a value V is conducted by:
- A) Get key ids of value range either by using values to keys reversed function or by fetching from key ids table. Key ids tree index where keys are the values may be maintained for optimization of range queries.
- B) Each key in the range is considered as operand in a complex query where all query operators are OR operators. Continue as with query over complex expression where all range keys are considered as query operands for OR expression.

Sorting Queries Results

This method enables sorting queries result according to a certain column(s) values order and presenting the rows from the results in sorted order.
- A) Execute the query based on the query where condition.
- B) Fetch inverted index of the first value by values order of the first sort by column. The values order can be calculated either from sorted key ids index or by key ids order in case keys ids order is equal to values order (for example: if key id equal to numeric values in numeric column). If inverted index is not in CHB format convert it to CHB format.
- C) Execute intersection operation (AND) between query result CHB and sort by value fetched CHB. The resulting CHB contains the list of rows id to be first in the sort order. Fetch rows either from data blocks or alternative store method and preset according to requested columns list. In case number of rows presented is less than the number of requested rows get the inverted index of the next value and repeat this step.
- D) If more than one sort by columns exists—repeat this using result of the intersection as query result and fetch first/next inverted index of the next sort by column. Do this recursively.

Performing Aggregation Queries with Serial Data Base

Aggregation queries are summaries based on values of one or more columns. Aggregations are calculated by serially scanning the original values of the aggregated columns. In a serial database it is usually most efficient to use the compressed column store to generate in memory vectors of original values that match the query conditions.
- A) Execute the where condition
- B) Fetch compressed key ids from compressed column(s) that participate in the aggregation according to row ids from result CHB
- C) Decompress the key ids from column, convert key ids to original values using keys reverse functions or keys index and placed the original values in vectors
- D) Calculate the aggregation over the vectors of the original values Adaptive Optimization of Serial Database Optimization method for serial database the improved queries performances in adaptive manner The optimization is dynamically adapted to both application queries need and data characteristics. The optimization method reduces query time by accessing full or partial queries results saved in a special adaptive optimization saved results table that contain query expression as key (operands and operators) and results in CHB format.

Before executing the method for query and fetch data from serial database, if the query expression includes two or more operators:
A) Search query expression and parts of the expression in saved results table
B) If expression found as a save results key fetch results from table
C) If saved result found it might not include row ids that were loaded after the result was save in the table. Therefore, if last row id in the result fetched from table is smaller than last row id committed:
  a. Fetch inverted indexes of the expression operators from the inverted indexes blocks. Need to get only the part of the inverted index that contains row ids that are not in the saved result. This can be achieved by fetch only from inverted indexes blocks at which last row ids is greater than save result last row id.

b. Execute the Boolean operation over the fetched inverted index
c. Glue or merge results from save results with the updated results that include the newer row ids.
d. Update saved results table with the merged result
e. Use merged result as expression result D) Continue with query execution. Search each expression in the saved results. If not found fetch it in the standard method via the inverted indexes.

Figure 9:
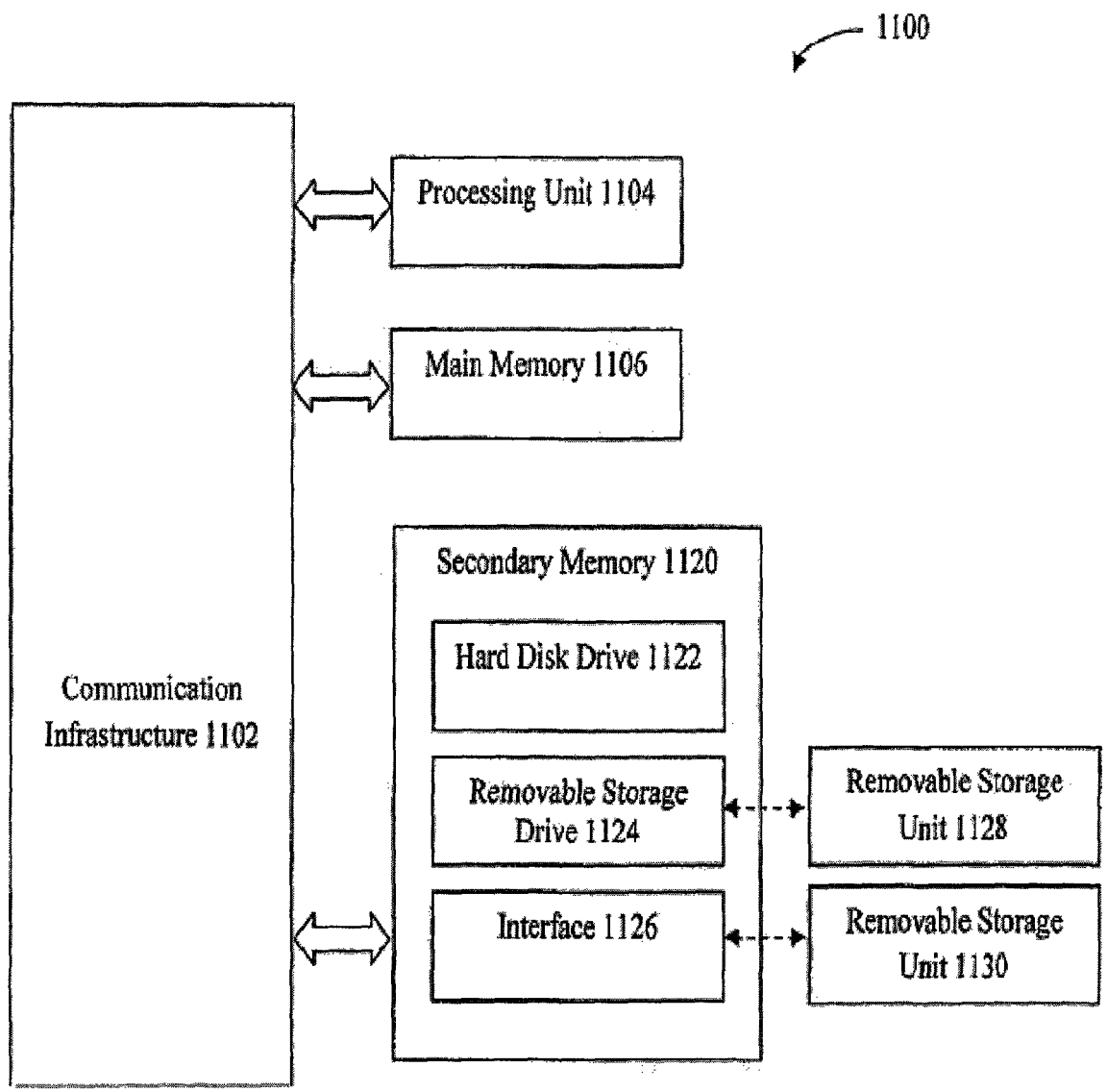
FIG. 9 is a block diagram of an exemplary computer system upon which the current innovation can be embodied.

Cases where expressions and results might be saved in saved results table:

1. When query execution completed and query expression is likely to be repeated in future queries, for example if expression contains small number of common operators
2. When query execution completed and part of the query expression is likely to be repeated in future queries, for example if expression part contains small number of common operators. Save only the relevant part
3. If query or expression are expected to be commonly used
4. If expression contain low cardinality operands FIG. 9 is a block diagram of an exemplary computer system upon which the current innovation can be embodied. Referring now to FIG. 9, the exemplary computer system 1100 upon which the current innovation can be embodied, includes a processing unit 1104 that includes one or more processors. Processor unit 1104 is connected to a communication infrastructure 1102, which may comprise, for example, a bus or a network.

Computer system 1100 also includes a main memory 1106, preferably random access memory (RAM), and may also include a secondary memory 1120. Secondary memory 1120 may include, for example, a hard disk drive 1122, a removable storage drive 1124, and/or a memory stick. Removable storage drive 1124 may comprise a floppy disk drive, a magnetic tape drive, an optical disk drive, a flash memory, or the like. Removable storage drive 1124 reads from and/or writes to a removable storage unit 1128 in a well-known manner Removable storage unit 1128 may comprise a floppy disk, magnetic tape, optical disk, or the like, which is read by and written to by removable storage drive 1124. As will be appreciated by persons skilled in the relevant art(s), removable storage unit 1128 includes a computer usable storage medium having stored therein computer software and/or data.

In alternative implementations, secondary memory 1120 may include other similar means for allowing computer programs or other instructions to be loaded into computer system 1100. Such means may include, for example, a removable storage unit 1130 and an interface 1126. Examples of such means may include a program cartridge and cartridge interface (such as that found in video game devices), a removable memory chip (such as an EEPROM, EPROM, or PROM) and associated socket, and other removable storage units 1130 and interfaces 1126 which allow software and data to be transferred from the removable storage unit 1130 to computer system 1100.

As used herein, the terms "computer program medium" and "computer readable medium" are used to generally refer to media such as removable storage unit 1128, removable storage unit 1130 and a hard disk installed in hard disk drive 1122. Computer program medium and computer readable medium can also refer to memories, such as main memory 1106 and secondary memory 1120, which can be semiconductor devices (e.g., DRAMS, etc.). These computer program products are means for providing software to computer system 1100.

Computer programs (also called computer control logic, programming logic, or logic) are stored in main memory 1106 and/or secondary memory 1120. Such computer programs, when executed, enable the computer system 1100 to implement features of the present invention as discussed herein. Accordingly, such computer programs represent controllers of the computer system 1100. Where the invention is implemented using software, the software may be stored in a computer program product and loaded into computer system 1100 using removable storage drive 1124, or interface 1126.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary non-volatile storage devices (e.g., hard drives, floppy disks, CD ROMS, zip disks, tapes, magnetic storage devices, optical storage devices, MEMs, nanotechnology-based storage device, etc.).

Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

The invention claimed is:

1. A computerized system comprising:
  a processor; and
  a computer-readable non-transient memory in communication with the processor, the memory storing instructions that when executed manage a Super Hierarchiel Bitmaps (SHB) data structure representing a set of integers that includes:
  (a) at least one word, wherein each said word contains a predefined number of, bits, wherein each said bit is selected from the group including 1-bits and 0-bits;
  (b) a plurality of bit vectors, each said bit vector containing at least one word, wherein said at least one word is selected from the group including an empty word containing only said 0-bits and a non-empty word containing at least one said 1-bit;
  (c) one or more compressed layers representing corresponding one or more non-compressed layers, wherein:
  (i) each said non-compressed layer includes one said bit vector, wherein said one or more non-compressed layers are organized sequentially, such that each of said one or more non-compressed layers except for a last non-compressed layer has a subsequent non-compressed layer related thereto;
  (ii) the set of integers containing a plurality of positive integer members, wherein each member is represented by a 1-bit in the last non-compressed layer and wherein the position of each said 1-bit in said last non-compressed layer is equal to a value of said positive integer member;
  (iii) each said non-empty word is represented by a respective 1-bit in a previous non-compressed layer such that a number of said 1-bits in said previous non-compressed layer is equivalent to a number of said non-empty words in a subsequent non-compressed layer and a position of each of said 1-bit in said previous non-compressed layer represents a corresponding position of each said non-empty word in said subsequent non-compressed layer;
  wherein said compressed layers other than a first compressed layer include only said non-empty words, and each position of said empty words in said non-compressed layer is represented by a position of each said 0-bit in said previous non-compressed layer, said empty words in any non-compressed layer being representative of removed empty words in any corresponding compressed layer, and each position of said removed empty words in a second compressed layer is represented by a position of each said 0-bit in said first compressed layer, so that said second compressed layer is decompressed into a second decompressed layer by calculating said positions of said removed empty words in said second compressed layer according to said positions of said 0-bits in said first compressed layer, and each said compressed layer other than said first and second compressed layers is decompressed sequentially by calculating said positions of said removed empty words in each said compressed layer according to said positions of said 0-bits in a previous decompressed layer; and
  (d) one or more counter vectors, each of said counter vectors related to each of said one or more compressed layers, wherein for each said word in each of said compressed layers there exists a related counter member and wherein each said counter member holds a counter value which equals a cumulative number of 1-bits, said cumulative number calculated from a first position in each of said bit vectors to each respective said word in said bit vector related to said counter member.

2. A computerized method of searching for an integer member U, comprising:
  A. providing a Super Hierarchiel Bitmaps (SHB) data structure representing a set of integer members, the SHB data structure being stored on a computer-readable non-transient memory in communication with a processor, the SHB data structure including:
    (a) at least one word, wherein each said word contains a predefined number of bits, wherein each said bit is selected from the group including 1-bits and 0-bits;
    (b) a plurality of bit vectors, each said bit vector containing at least one word, wherein said at least one word is selected from the group including an empty word containing only said 0-bits and a non-empty word containing at least one said 1-bit;
    (c) one or more compressed layers representing corresponding one or more non-compressed layers, wherein:
      (i) each said non-compressed layer includes one said bit vector, wherein said one or more non-compressed layers are organized sequentially, such that each of said one or more non-compressed layers except for a last non-compressed layer has a subsequent non-compressed layer related thereto;
      (ii) the set of integers containing a plurality of positive integer members, wherein each member is represented by a 1-bit in the last non-compressed layer and wherein the position of each said 1-bit in said last non-compressed layer is equal to a value of said positive integer member;
      (iii) each said non-empty word is represented by a respective 1-bit in a previous non-compressed layer such that a number of said 1-bits in said previous non-compressed layer is equivalent to a number of said non-empty words in a subsequent non-compressed layer and a position of each of said 1-bit in said previous non-compressed layer represents a corresponding position of each said non-empty word in said subsequent non-compressed layer;
  wherein said compressed layers other than a first compressed layer include only said non-empty words, and each position of said empty words in said non compressed layer is represented by a position of each said 0-bit in said previous non-compressed layer, said empty words in any non-compressed layer being representative of removed empty words in any corresponding compressed layer, and each position of said removed empty words in a second compressed layer is represented by a position of each said 0-bit in said first compressed layer, so that said second compressed layer is decompressed into a second decompressed layer by calculating said positions of said removed empty words in said second compressed layer according to said positions of said 0-bits in said first compressed layer, and each said compressed layer other than said first and second compressed layers is decompressed sequentially by calculating said positions of said removed empty words in each said compressed layer according to said positions of said 0-bits in a previous decompressed layer; and
    (d) one or more counter vectors, each of said counter vectors related to each of said one or more compressed layers, wherein for each said word in each of said compressed layers there exists a related counter member and wherein each said counter member holds a counter value which equals a cumulative number of 1-bits, said cumulative number calculated from a first position in each of said bit vectors to each respective said word in said bit vector related to said counter member;
  B. searching for said integer member U represented by a bit representation in a last compressed layer in said SHB data structure using a SHB Search function.

3. A computerized method of creating a Super Hierarchiel Bitmaps (SHB) data structure representing a set of integer members using a SHB Create function, the SHB data structure being stored on a computer-readable non-transient memory in communication with a processor, comprising:
  A. obtaining said set of integer members ordered in an ascending order from the lowest value to the highest value;
  B. creating said SHB data structure that represents said set of integer members, said SHB data structure includes:
    (a) at least one word, wherein each said word contains a predefined number of bits, wherein each said bit is selected from the group including 1-bits and 0-bits;
    (b) a plurality of bit vectors, each said bit vector containing at least one word, wherein said at least one word is selected from the group including an empty word containing only said 0-bits and a non-empty word containing at least one said 1-bit;
    (c) one or more compressed layers representing corresponding one or more non-compressed layers, wherein:
      (i) each said non-compressed layer includes one said bit vector, wherein said one or more non-compressed layers are organized sequentially, such that each of said one or more non-compressed layers except for a last non-compressed layer has a subsequent non-compressed layer related thereto;
      (ii) the set of integers containing a plurality of positive integer members, wherein each member is represented by a 1-bit in the last non-compressed layer and wherein the position of each said 1-bit in said last non-compressed layer is equal to a value of said positive integer member;

(iii) each said non-empty word is represented by a respective 1-bit in a previous non-compressed layer such that a number of said 1-bits in said previous non-compressed layer is equivalent to a number of said non-empty words in a subsequent non-compressed layer and a position of each of said 1-bit in said previous non-compressed layer represents a corresponding position of each said non-empty word in said subsequent non-compressed layer;

wherein said compressed layers other than a first compressed layer include only said non-empty words, and each position of said empty words in said non compressed layer is represented by a position of each said 0-bit in said previous non-compressed layer, said empty words in any non-compressed layer being representative of removed empty words in any corresponding compressed layer, and each position of said removed empty words in a second compressed layer is represented by a position of each said 0-bit in said first compressed layer, so that said second compressed layer is decompressed into a second decompressed layer by calculating said positions of said removed empty words in said second compressed layer according to said positions of said 0-bits in said first compressed layer, and each said compressed layer other than said first and second compressed layers is decompressed sequentially by calculating said positions of said removed empty words in each said compressed layer according to said positions of said 0-bits in a previous decompressed layer; and (d) one or more counter vectors, each of said counter vectors related to each of said one or more compressed layers, wherein for each said word in each of said compressed layers there exists a related counter member and wherein each said counter member holds a counter value which equals a cumulative number of 1-bits, said cumulative number calculated from a first position in each of said bit vectors to each respective said word in said bit vector related to said counter member.

4. A computerized method of creating a Super Hierarchiel Bitmaps (SHB) index using an SHB data structure, the SHB data structure representing a set of integer members, said SHB data structure being stored on a computer-readable non-transient memory in communication with a processor, comprising:

A. providing index pairs each including a set member constituting an integer member, and a mapped value related to said set member;

B. arranging said index pairs to an ordered set of index pairs according to an ascending order of integer members of said index pairs, wherein said integer members of said ordered set of index pairs being representatives of said set of integer members ordered in said ascending order;

C. creating said SHB data structure that represents said set of integer members, said SHB data structure includes:

(a) at least one word, wherein each said word contains a predefined number of bits, wherein each said bit is selected from the group including 1-bits and 0-bits;

(b) a plurality of bit vectors, each said bit vector containing at least one word, wherein said at least one word is selected from the group including an empty word containing only said 0-bits and a non-empty word containing at least one said 1-bit;

(c) one or more compressed layers representing corresponding one or more non-compressed layers, wherein:

(i) each said non-compressed layer includes one said bit vector, wherein said one or more non-compressed layers are organized sequentially, such that each of said one or more non-compressed layers except for a last non-compressed layer has a subsequent non-compressed layer related thereto;

(ii) the set of integers containing a plurality of positive integer members, wherein each member is represented by a 1-bit in the last non-compressed layer and wherein the position of each said 1-bit in said last non-compressed layer is equal to a value of said positive integer member;

(iii) each said non-empty word is represented by a respective 1-bit in a previous non-compressed layer such that a number of said 1-bits in said previous non-compressed layer is equivalent to a number of said non-empty words in a subsequent non-compressed layer and a position of each of said 1-bit in said previous non-compressed layer represents a corresponding position of each said non-empty word in said subsequent non-compressed layer;

wherein said compressed layers other than a first compressed layer include only said non-empty words, and each position of said empty words in said non compressed layer is represented by a position of each said 0-bit in said previous non-compressed layer, said empty words in any non-compressed layer being representative of removed empty words in any corresponding compressed layer, and each position of said removed empty words in a second compressed layer is represented by a position of each said 0-bit in said first compressed layer, so that said second compressed layer is decompressed into a second decompressed layer by calculating said positions of said removed empty words in said second compressed layer according to said positions of said 0-bits in said first compressed layer, and each said compressed layer other than said first and second compressed layers is decompressed sequentially by calculating said positions of said removed empty words in each said compressed layer according to said positions of said 0-bits in a previous decompressed layer; and (d) one or more counter vectors, each of said counter vectors related to each of said one or more compressed layers, wherein for each said word in each of said compressed layers there exists a related counter member and wherein each said counter member holds a counter value which equals a cumulative number of 1-bits, said cumulative number calculated from a first position in each of said bit vectors to each respective said word in said bit vector related to said counter member;

D. allocating a value vector V associated with said created SHB data structure, wherein each member of said value vector V[n] holds a mapped value related to a respective integer member of a nth index pair of said ordered set of index pairs.

5. A computerized method of creating hash for a plurality of keys in a key set using a Super Hierarchiel Bitmaps (SHB) index based on a SHB data structure, the SHB data structure representing a set of integer members, said SHB data structure being stored on a computer-readable non-transient memory in communication with a processor, comprising:

A. hash said keys with a hash function $f$ to respective hashed values;

B. collect said keys in a key vector K and said respective hashed values thereof in a hashed value vector H, so that a position m of a key k in said key vector is equal to a corresponding position m of a respective hashed value of said key k in said hashed value vector, such that $H[m]=f(K[m])$;

C. create said SHB data structure representing said hashed values in said hashed value vector H, wherein the hashed values being representatives of said set of integer members, said SHB data structure includes:
(a) at least one word, wherein each said word contains a predefined number of bits, wherein each said bit is selected from the group including 1-bits and 0-bits;
(b) a plurality of bit vectors, each said bit vector containing at least one word, wherein said at least one word is selected from the group including an empty word containing only said 0-bits and a non-empty word containing at least one said 1-bit;
(c) one or more compressed layers representing corresponding one or more non-compressed layers, wherein:
(i) each said non-compressed layer includes one said bit vector, wherein said one or more non-compressed layers are organized sequentially, such that each of said one or more non-compressed layers except for a last non-compressed layer has a subsequent non-compressed layer related thereto;
(ii) the set of integers containing a plurality of positive integer members, wherein each member is represented by a 1-bit in the last non-compressed layer and wherein the position of each said 1-bit in said last non-compressed layer is equal to a value of said positive integer member;
(iii) each said non-empty word is represented by a respective 1-bit in a previous non-compressed layer such that a number of said 1-bits in said previous non-compressed layer is equivalent to a number of said non-empty words in a subsequent non-compressed layer and a position of each of said 1-bit in said previous non-compressed layer represents a corresponding position of each said non-empty word in said subsequent non-compressed layer;
wherein said compressed layers other than a first compressed layer include only said non-empty words, and each position of said empty words in said non compressed layer is represented by a position of each said 0-bit in said previous non-compressed layer, said empty words in any non-compressed layer being representative of removed empty words in any corresponding compressed layer, and each position of said removed empty words in a second compressed layer is represented by a position of each said 0-bit in said first compressed layer, so that said second compressed layer is decompressed into a second decompressed layer by calculating said positions of said removed empty words in said second compressed layer according to said positions of said 0-bits in said first compressed layer, and each said compressed layer other than said first and second compressed layers is decompressed sequentially by calculating said positions of said removed empty words in each said compressed layer according to said positions of said 0-bits in a previous decompressed layer; and
(d) one or more counter vectors, each of said counter vectors related to each of said one or more compressed layers, wherein for each said word in each of said compressed layers there exists a related counter member and wherein each said counter member holds a counter value which equals a cumulative number of 1-bits, said cumulative number calculated from a first position in each of said bit vectors to each respective said word in said bit vector related to said counter member;
D. create a position vector V, wherein V[s] equals the position m of said key k in said key vector K, such that K[V[s]]=k, wherein s indicates a serial number of a respective hashed value H[m] in said SHB data structure;
whereby the hashed values in said SHB data structure being representatives of said integer members, and V[s] being representatives of said mapped values related to said respective integer members.

6. A computer program product that includes a computer-readable non-transient memory storing instructions for performing a method of searching for an integer member U, comprising:
A. providing a Super Hierarchiel Bitmaps (SHB) data structure representing a set of integer members, the SHB data structure being stored on a computer-readable non-transient memory in communication with a processor, the SHB data structure including:
(a) at least one word, wherein each said word contains a predefined number of bits, wherein each said bit is selected from the group including 1-bits and 0-bits;
(b) a plurality of bit vectors, each said bit vector containing at least one word, wherein said at least one word is selected from the group including an empty word containing only said 0-bits and a non-empty word containing at least one said 1-bit;
(c) one or more compressed layers representing corresponding one or more non-compressed layers, wherein:
(i) each said non-compressed layer includes one said bit vector, wherein said one or more non-compressed layers are organized sequentially, such that each of said one or more non-compressed layers except for a last non-compressed layer has a subsequent non-compressed layer related thereto;
(ii) the set of integers containing a plurality of positive integer members, wherein each member is represented by a 1-bit in the last non-compressed layer and wherein the position of each said 1-bit in said last non-compressed layer is equal to a value of said positive integer member;
(iii) each said non-empty word is represented by a respective 1-bit in a previous non-compressed layer such that a number of said 1-bits in said previous non-compressed layer is equivalent to a number of said non-empty words in a subsequent non-compressed layer and a position of each of said 1-bit in said previous non-compressed layer represents a corresponding position of each said non-empty word in said subsequent non-compressed layer;
wherein said compressed layers other than a first compressed layer include only said non-empty words, and each position of said empty words in said non compressed layer is represented by a position of each said 0-bit in said previous non-compressed layer, said empty words in any non-compressed layer being representative of removed empty words in any corresponding compressed layer, and each position of said removed empty words in a second compressed layer is represented by a position of each said 0-bit in said first compressed layer, so that said second compressed layer is decompressed into a second decompressed layer by calculating said positions of said removed empty words in said second compressed layer according to said positions of said 0-bits in said first compressed layer, and each said compressed layer other than said first and second compressed layers is decompressed sequentially by calculating said positions of said removed empty words in each said compressed layer according to said positions of said 0-bits in a previous decompressed layer; and
(d) one or more counter vectors, each of said counter vectors related to each of said one or more compressed layers, wherein for each said word in each of said compressed layers there exists a related counter member and wherein each said counter member holds a counter value which equals a cumulative number of 1-bits, said cumulative number calculated from a first position in each of said bit vectors to each respective said word in said bit vector related to said counter member;

searching for said integer member U represented by a bit representation in a last compressed layer in said SHB data structure using a SHB Search function.

7. The computerized system of claim 1, wherein the processor is configured to create the SHB data structure representing a set of integer members using a SHB Create function.

8. The computerized system of claim 1, wherein the processor is configured to search an integer member U represented by a bit representation in a last compressed layer in said SHB data structure using a SHB Search function.

9. The computerized system of claim 1, wherein at least one of the counter vectors is optimized by using multiple counter vector layers, wherein each of said multiple counter vector layers except for a counter vector layer 1 uses a next counter vector layer of said multiple counter vector layers as a base to calculate the counter values held by the counter members thereof.

10. The computerized method of claim 2, wherein said SHB search function includes:

calculating in said SHB data structure sequentially in each of said compressed layers, starting from said first compressed layer, an expected position of a bit representation for said U until a condition is met, said condition being that a bit representation in said calculation having a value 0 which indicates that said U is not represented by said SHB data structure;

otherwise said condition is not met and the bit representation in said last compressed layer having a value 1 indicates that said U is represented by said SHB data structure.

11. The computerized system of claim 7, wherein the Create function comprises:

associating said set of integer members with corresponding bit representations in said compressed layers of said SHB data structure, including:

a) obtaining said set of integer members ordered in an ascending order from the lowest value to the highest value;

b) for each integer member in said set, starting from the lowest value, calculating a position of a bit representation in each of said compressed layers, and c) calculate said counter vector related to each of said compressed layers.

12. The computerized system of claim 8, wherein the SHB search function includes:

calculating in said SHB data structure sequentially in each of said compressed layers, starting from said first compressed layer, an expected position of a bit representation for said U until a condition is met, said condition being that a bit representation in said calculation having a value 0 which indicates that said U is not represented by said SHB data structure;

otherwise said condition is not met and the bit representation in said last compressed layer having a value 1 indicates that said U is represented by said SHB data structure.

13. The computerized system of claim 8, wherein said SHB search function comprises:

1) for the first compressed layer of said SHB data structure, calculating $W_0 = (U-1) / K^L$, wherein $W_0$ indicates an expected actual position of a word that contains the bit representation in the first compressed layer;

K indicates the number of bits included in each said word;

L indicates the number of compressed layers in said SHB data structure;

2) for each compressed layer l of said SHB data structure, starting from said first compressed layer, i) calculating $R_{l+1} = (U-1) / K^{(L-(l+1))}$, wherein $R_{l+1}$ indicates an expected virtual position of a word that contains the bit representation in the corresponding non-compressed layer l+1;

ii) calculating $B_l = R_{l+1} \% K$, wherein $B_l$ indicates an expected bit position of the bit representation within a word in said compressed layer l;

iii) calculating $V_l[W_l]$ & $2^{B_l}$, wherein $V_l$, indicates the bit vector included in the compressed layer l, $W_l$ indicates the expected actual position of the word that contains the bit representation in the compressed layer l, $V_l[W_l]$ indicates the word at the expected actual position $W_l$, in the bit vector $V_l$, and & indicates logical AND operation;

iv) if the value of $V_l[W_l]$ & $2^{B_l}$ is 0, determining that U is not an integer member in said data structure;

otherwise if the value of $V_l[W_l]$ & $2^{B_l}$ is 1, calculating $W_{l+1} = C_l[W_l] + \text{countLeftBits}(V_l[W_l], B_l)$, wherein $W_{l+1}$ indicates the expected actual position of the word that contains the bit representation in the compressed layer l+1, $C_l[W_l]$ indicates the counter value held by the counter member related to a previous word of said word at $W_l$, and countLeftBits($V_l[W_l], B_l$) indicates the number of bits that are set to 1 to the left of the expected bit position $B_l$ within the word $V_l[W_l]$ in said compressed layer l;

v) if said compressed layer l is a last compressed layer of said SHB data structure, determining that U is an integer member in said data structure;

otherwise if said compressed layer l is not the last compressed layer of said SHB data structure, repeating steps i)-v), until U is determined not being an integer member in said data structure, or until said compressed layer l is the last compressed layer of said SHB data structure.

14. The computerized system of claim 9, wherein the bit vector of any given layer of said compressed layers is divided into a plurality of groups each including a predefined number (W) of words, and each counter member of the counter vector in said counter vector layer 1 equals the cumulative number of 1-bits, said cumulative number calculated from a first position in each of said groups to each respective said word within each respective said group in said bit vector related to each said counter member; said multiple counter vector layers include a counter vector layer 2 in case the $W^{th}$ word is reached in said counter vector layer 1, and each counter member of the counter vector in said counter vector layer 2 counts the total number of 1-bits for each respective group of W words, wherein memory size of each counter member of the counter vector in the counter vector layer 2 is twice of the memory size of each counter member of the counter vector in the counter vector layer 1;

and wherein said multiple counter vector layers include a counter vector layer X in case the $W^{(X-1)th}$ word is reached in counter vector layer X−1, and each counter member of the counter vector in the counter vector layer X equals the total number of 1-bits for each respective group of $W^{(X-1)}$ words.

15. The computerized method of claim 10 further comprises:
    getting a serial number S of said integer member U represented by said bit representation in said last compressed layer in said SHB data structure.

16. The computerized system of claim 11, wherein said calculating of said step b) comprises:
    1) for the first compressed layer of said SHB data structure, calculating $W_0=(U-1)/K^L$,
       wherein $W_0$ indicates an actual position of a word that contains the bit representation in the first compressed layer;
       U indicates each said integer member in said set;
       K indicates the number of bits included in each said word;
       L indicates the number of compressed layers in said SHB data structure;
    2) for each compressed layer l of said SHB data structure, starting from said first compressed layer,
       i) calculating $R_{l+1}=(U-1)/K^{(L-(l+1))}$,
          wherein $R_{l+1}$ indicates a virtual position of a word that contains the bit representation in the corresponding non-compressed layer l+1;
       ii) calculating $B_l=R_{l+1}\ \%\ K$,
          wherein $B_l$ indicates a bit position of the bit representation within a word in said compressed layer l;
       iii) calculating $V_l[W_l]=V_l[W_l]\ |\ 2^{B_l}$,
          wherein $V_l$, indicates the bit vector included in the compressed layer l,
          $W_l$ indicates the actual position of the word that contains the bit representation in the compressed layer l,
          $V_l[W_l]$ indicates the word at the actual position $W_l$, in the bit vector $V_l$, and
          | indicates logical OR operation;
       iv) if the number of bits in $V_l[W_l]$ increases, calculating $T_l=T_l+1$,
          wherein $T_l$, indicates a counter representing the total number of bits that are set to 1 in said compressed layer l;
       v) calculating $W_{l+1}=T_l-1$,
          wherein $W_l$, indicates the actual position of the word that contains the bit representation in the compressed layer l+1.

17. The computerized system of claim 11, wherein said calculating of said step c) comprises:
    for each said compressed layer l, calculating $C_l[n+1]=C_l[n]+countBits(V_l[n])$,
    wherein $C_l$ indicates the counter vector related to said compressed layer l,
    n indicates a word position counter in the bit vector of each said compressed layer l,
    $C_l[n]$ indicates the counter value held by the counter member related to a previous word of said word at n, and
    $countBits(V_l[n])$ indicates the number of bits that are set to 1 in said word at n.

18. The computerized system of claim 11, wherein the processor is further configured to create an SHB index using said SHB data structure, including:
    a) provide index pairs each including a set member constituting an integer member, and a mapped value related to said set member;
    b) arrange said index pairs to an ordered set of index pairs according to an ascending order of integer members of said index pairs, wherein said integer members of said ordered set of index pairs being representatives of said set of integer members ordered in said ascending order;
    c) creating said SHB data structure from said set of integer members;
    d) allocate a value vector V associated with said created SHB data structure, wherein each member of said value vector V[n] holds a mapped value related to a respective integer member of a nth index pair of said ordered set of index pairs.

19. The computerized system of claim 11, wherein the processor is further configured to convert an array of non-compressed numeric values to an array of corresponding compressed values using said SHB data structure, comprising:
    1) create said SHB data structure from said array of non-compressed numeric values, wherein said array of non-compressed numeric values being representatives of said set of integer members;
    2) determine a number of bits representing each said non-compressed numeric value using said SHB data structure, and
    3) generate the array of compressed values representing corresponding non-compressed numeric values, each compressed value in said array of compressed values being represented by said number of bits.

20. The computerized system of claim 13, wherein said step v) further comprises:
    getting a serial number S of said integer member U represented by said bit representation in said last compressed layer in said SHB data structure, wherein said S equals $C_l[W_l]+countLeftBits(V_l[W_l], B_l)+1$ if said compressed layer l is the last compressed layer of said SHB data structure and U is determined to be an integer member in said data structure.

21. The computerized system of claim 18, wherein the processor is further configured to search for a given mapped value of an integer member in said SHB index by getting a serial number s of said integer member in said SHB data structure, and retrieving the given mapped value of said integer member in the value vector V according to the serial number s.

22. The computerized system of claim 19, wherein said number of bits equals $Log2(size(SHB))$, wherein said size (SHB) indicates the number of non-compressed numeric values represented in said SHB data structure; and
    wherein said generating in said step 3) comprises:
    get a serial number of each said non-compressed numeric value in said SHB data structure,
    translate said serial number to a corresponding compressed value of said non-compressed numeric value, said compressed value being represented by said number of bits, and
    place said compressed value into said array of compressed values according to a position of the corresponding non-compressed numeric value in said array of non-compressed numeric values.

23. The computerized system of claim 21, wherein the processor is configured to create hash for a plurality of keys in a key set, using said SHB index, comprising:
    a) hash said keys with a hash function $f$ to respective hashed values;
    b) collect said keys in a key vector K and said respective hashed values thereof in a hashed value vector H, so that a position m of a key k in said key vector is equal to a corresponding position m of a respective hashed value of said key k in said hashed value vector, such that $H[M]=f(K[m])$;
    c) create said SHB data structure based on said hashed values in said hashed value vector H, wherein the hashed values being representatives of said set of integer members;

d) create a position vector V, wherein V[s] equals the position m of said key k in said key vector K, such that K[V[s]]=k, wherein s indicates a serial number of a respective hashed value H[m] in said SHB data structure;

whereby the hashed values in said SHB data structure being representatives of said integer members, and V[s] being representatives of said mapped values related to said respective integer members.

24. The computerized system of claim 22, wherein the processor is further configured to convert said array of compressed values to said array of numeric values, comprising:

prepare a reverse index for each compressed value; and obtain the corresponding non-compressed numeric value for each said compressed value according to said reverse index.

25. The computerized system of claim 23, wherein the processor is further configured to determine if a key k1 is in said key set, comprising:

a) hash said key k1 with said hash function $f$ to a hashed value $f(k1)$;

b) search for said hashed value $f(k1)$ of said key k1 in said SHB data structure;

c) if the hashed value $f(k1)$ is not found in said SHB data structure, k1 is determined not to be in said key set; or if the hashed value $f(k1)$ is found in said SHB data structure, compare said key k1 to a key k2 at a position in said key vector K indicated by the position vector V; if k1 equals k2, k1 is determined to be in said key set, or if k1 does not equal k2, rehash k1 until said key k2 that equals k1 is found, or until the hashed value is not found in said SHB data structure.

\* \* \* \* \*